(12) United States Patent
Aabye et al.

(10) Patent No.: US 10,769,614 B2
(45) Date of Patent: *Sep. 8, 2020

(54) OVER THE AIR UPDATE OF PAYMENT TRANSACTION DATA STORED IN SECURE MEMORY

(71) Applicant: VISA INTERNATIONAL SERVICE ASSOCIATION, San Francisco, CA (US)

(72) Inventors: Christian Aabye, Foster City, CA (US); Hao Ngo, San Jose, CA (US); David William Wilson, Camberley (GB); Gustavo Mariath Zeiden, Chineham (GB); Chris Pitchford, Chineham (GB); Kiushan Pirzadeh, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 85 days.

This patent is subject to a terminal disclaimer.

(21) Appl. No.: 16/030,394

(22) Filed: Jul. 9, 2018

(65) Prior Publication Data

US 2019/0019176 A1    Jan. 17, 2019

Related U.S. Application Data

(60) Continuation of application No. 13/662,371, filed on Oct. 26, 2012, now Pat. No. 10,037,523, which is a
(Continued)

(51) Int. Cl.
*G06Q 20/32* (2012.01)
*G06Q 20/10* (2012.01)
(Continued)

(52) U.S. Cl.
CPC ............. *G06Q 20/32* (2013.01); *G06Q 20/10* (2013.01); *G06Q 20/20* (2013.01); *G06Q 20/202* (2013.01);
(Continued)

(58) Field of Classification Search
CPC ........ G06Q 20/32; G06Q 20/12; G06Q 20/10; G06Q 20/20
(Continued)

(56) References Cited

U.S. PATENT DOCUMENTS 4,044,231 A    8/1977 Beck et al.
4,613,904 A    9/1986 Lurie
(Continued)

FOREIGN PATENT DOCUMENTS

EP    1096439    5/2001
EP    1136961    9/2001
(Continued)

OTHER PUBLICATIONS

U.S. Appl. No. 12/563,410, "Final Office Action", dated May 1, 2012, 12 pages.
(Continued)

*Primary Examiner* — Vanel Frenel
(74) *Attorney, Agent, or Firm* — Kilpatrick Townsend & Stockton LLP

(57) ABSTRACT

A system, apparatus, and method for processing payment transactions that are conducted using a mobile device that includes a contactless element, such as an integrated circuit chip. The invention enables the updating, correction or synchronization of transaction data maintained by an Issuer with that stored on the device. This is accomplished by using a wireless (cellular) network as a data communication channel for data provided by an Issuer to the mobile device, and is particularly advantageous in circumstances in which
(Continued)

the contactless element is not presently capable of communication with a device reader or point of sale terminal that uses a near field communications mechanism. Data transferred between the mobile device and Issuer may be encrypted and decrypted to provide additional security and protect the data from being accessed by other users or applications. If encryption keys are used for the encryption and decryption processes, they may be distributed by a key distribution server or other suitable entity to a mobile gateway which participates in the data encryption and decryption operations.

20 Claims, 7 Drawing Sheets

Related U.S. Application Data division of application No. 12/563,421, filed on Sep. 21, 2009.

(60) Provisional application No. 61/099,060, filed on Sep. 22, 2008.

(51) Int. Cl.
G06Q 20/20 (2012.01)
G06Q 20/38 (2012.01)
G06Q 20/40 (2012.01)
G06Q 40/00 (2012.01)

(52) U.S. Cl.
CPC ......... *G06Q 20/204* (2013.01); *G06Q 20/322* (2013.01); *G06Q 20/3224* (2013.01); *G06Q 20/3278* (2013.01); *G06Q 20/382* (2013.01); *G06Q 20/3829* (2013.01); *G06Q 20/40* (2013.01); *G06Q 40/12* (2013.12)

(58) Field of Classification Search
USPC ...... 705/16, 39, 35, 64, 40, 17, 74; 455/411, 455/556.1
See application file for complete search history.

(56) References Cited

U.S. PATENT DOCUMENTS

| | | |
|---|---|---|
| 4,614,861 A | 9/1986 | Pavlov et al. |
| 4,674,041 A | 6/1987 | Lemon et al. |
| 4,701,601 A | 10/1987 | Francini et al. |
| 4,868,376 A | 9/1989 | Lessin et al. |
| 5,034,597 A | 7/1991 | Atsumi et al. |
| 5,305,196 A | 4/1994 | Deaton et al. |
| 5,327,508 A | 7/1994 | Deaton et al. |
| 5,353,218 A | 10/1994 | De Lapa et al. |
| 5,359,183 A | 10/1994 | Skodlar |
| 5,388,165 A | 2/1995 | Deaton et al. |
| RE34,915 E | 4/1995 | Nichtberger et al. |
| 5,420,606 A | 5/1995 | Begum et al. |
| 5,430,644 A | 7/1995 | Deaton et al. |
| 5,448,471 A | 9/1995 | Deaton et al. |
| 5,465,206 A | 11/1995 | Hilt et al. |
| 5,477,038 A | 12/1995 | Levine et al. |
| 5,483,444 A | 1/1996 | Heintzeman et al. |
| 5,500,513 A | 3/1996 | Langhans et al. |
| 5,502,636 A | 3/1996 | Clarke |
| 5,530,438 A | 6/1996 | Bickham et al. |
| 5,564,073 A | 10/1996 | Takahisa |
| 5,577,266 A | 11/1996 | Takahisa et al. |
| 5,579,537 A | 11/1996 | Takahisa |
| 5,592,560 A | 1/1997 | Deaton et al. |
| 5,604,921 A | 2/1997 | Alanara |
| 5,615,110 A | 3/1997 | Wong |
| 5,621,201 A | 4/1997 | Langhans et al. |
| 5,621,812 A | 4/1997 | Deaton et al. |
| 5,627,549 A | 5/1997 | Park |
| 5,638,457 A | 6/1997 | Deaton et al. |
| 5,642,485 A | 6/1997 | Deaton et al. |
| 5,644,723 A | 7/1997 | Deaton et al. |
| 5,649,114 A | 7/1997 | Deaton et al. |
| 5,659,165 A | 8/1997 | Jennings et al. |
| 5,659,469 A | 8/1997 | Deaton et al. |
| 5,675,662 A | 10/1997 | Deaton et al. |
| 5,678,939 A | 10/1997 | Ross |
| 5,687,322 A | 11/1997 | Deaton et al. |
| 5,708,422 A | 1/1998 | Blonder et al. |
| 5,710,886 A | 1/1998 | Christensen et al. |
| 5,717,866 A | 2/1998 | Naftzger |
| 5,761,648 A | 6/1998 | Golden et al. |
| 5,777,903 A | 7/1998 | Piosenka et al. |
| 5,791,991 A | 8/1998 | Small |
| 5,793,972 A | 8/1998 | Shane |
| 5,806,044 A | 9/1998 | Powell |
| 5,822,735 A | 10/1998 | De Lapa et al. |
| 5,855,007 A | 12/1998 | Jovicic et al. |
| 5,870,030 A | 2/1999 | DeLuca et al. |
| 5,884,277 A | 3/1999 | Khosla |
| 5,905,246 A | 5/1999 | Fajkowski |
| 5,907,830 A | 5/1999 | Engel et al. |
| 5,924,080 A | 7/1999 | Johnson |
| 5,945,653 A | 8/1999 | Walker et al. |
| 5,959,577 A | 9/1999 | Fan et al. |
| 5,974,399 A | 10/1999 | Giuliani et al. |
| 5,991,749 A | 11/1999 | Morrill, Jr. |
| 6,002,771 A | 12/1999 | Nielsen |
| 6,009,411 A | 12/1999 | Kepecs |
| 6,009,415 A | 12/1999 | Shurling et al. |
| 6,012,038 A | 1/2000 | Powell |
| 6,014,634 A | 1/2000 | Scroggie et al. |
| 6,018,718 A | 1/2000 | Walker et al. |
| 6,029,151 A | 2/2000 | Nikander |
| 6,035,280 A | 3/2000 | Christensen |
| 6,041,309 A | 3/2000 | Laor |
| 6,049,778 A | 4/2000 | Walker et al. |
| 6,055,505 A | 4/2000 | Elston |
| 6,062,472 A | 5/2000 | Cheung |
| 6,062,991 A | 5/2000 | Moriarty et al. |
| 6,064,990 A | 5/2000 | Goldsmith |
| 6,067,526 A | 5/2000 | Powell |
| 6,067,529 A | 5/2000 | Ray et al. |
| 6,076,068 A | 6/2000 | Delapa et al. |
| 6,076,069 A | 6/2000 | Laor |
| 6,076,101 A | 6/2000 | Kamakura et al. |
| 6,128,599 A | 10/2000 | Walker et al. |
| 6,185,290 B1 | 2/2001 | Shaffer et al. |
| 6,185,541 B1 | 2/2001 | Scroggie et al. |
| 6,227,447 B1 | 5/2001 | Campisano |
| 6,237,145 B1 | 5/2001 | Narasimhan et al. |
| 6,247,129 B1 | 6/2001 | Keathley et al. |
| 6,267,292 B1 | 7/2001 | Walker et al. |
| 6,279,112 B1 | 8/2001 | O'Toole, Jr. et al. |
| 6,292,786 B1 | 9/2001 | Deaton et al. |
| 6,307,958 B1 | 10/2001 | Deaton et al. |
| 6,318,631 B1 | 11/2001 | Halperin |
| 6,321,208 B1 | 11/2001 | Barnett et al. |
| 6,330,543 B1 | 12/2001 | Kepecs |
| 6,330,550 B1 | 12/2001 | Brisebois et al. |
| 6,334,108 B1 | 12/2001 | Deaton et al. |
| 6,336,098 B1 | 1/2002 | Fortenberry et al. |
| 6,336,099 B1 | 1/2002 | Barnett et al. |
| 6,341,724 B2 | 1/2002 | Campisano |
| 6,351,735 B1 | 2/2002 | Deaton et al. |
| 6,377,935 B1 | 4/2002 | Deaton et al. |
| 6,378,775 B2 | 4/2002 | Hayashida |
| 6,381,324 B1 | 4/2002 | Shaffer et al. |
| 6,424,949 B1 | 7/2002 | Deaton et al. |
| 6,424,951 B1 | 7/2002 | Shurling et al. |
| 6,434,534 B1 | 8/2002 | Walker et al. |
| 6,470,181 B1 | 10/2002 | Maxwell |
| 6,484,146 B2 | 11/2002 | Day et al. |
| 6,488,203 B1 | 12/2002 | Stoutenburg et al. |
| 6,505,046 B1 | 1/2003 | Baker |
| 6,516,302 B1 | 2/2003 | Deaton et al. |
| 6,529,725 B1 | 3/2003 | Joao et al. |

(56) References Cited

U.S. PATENT DOCUMENTS

| | | |
|---|---|---|
| 6,535,855 B1 | 3/2003 | Cahill et al. |
| 6,557,752 B1 | 5/2003 | Yacoob |
| 6,560,581 B1 | 5/2003 | Fox et al. |
| 6,584,309 B1 | 6/2003 | Whigham |
| 6,587,835 B1 | 7/2003 | Treyz et al. |
| 6,601,040 B1 | 7/2003 | Kolls |
| 6,601,759 B2 | 8/2003 | Fife et al. |
| 6,609,104 B1 | 8/2003 | Deaton et al. |
| 6,611,811 B1 | 8/2003 | Deaton et al. |
| 6,631,849 B2 | 10/2003 | Blossom |
| 6,647,257 B2 | 11/2003 | Owensby |
| 6,647,269 B2 | 11/2003 | Hendrey et al. |
| 6,664,948 B2 | 12/2003 | Crane et al. |
| 6,684,195 B1 | 1/2004 | Deaton et al. |
| 6,685,093 B2 | 2/2004 | Challa et al. |
| 6,736,322 B2 | 5/2004 | Gobburu et al. |
| 6,747,547 B2 | 6/2004 | Benson |
| 6,764,003 B1 | 7/2004 | Martschitsch et al. |
| 6,775,539 B2 | 8/2004 | Deshpande |
| 6,832,721 B2 | 12/2004 | Fujii |
| 6,837,425 B2 | 1/2005 | Gauthier et al. |
| 6,868,391 B1 | 3/2005 | Hultgren |
| 6,877,665 B2 | 4/2005 | Challa et al. |
| 6,912,398 B1 | 6/2005 | Domnitz |
| 6,915,272 B1 | 7/2005 | Zilliacus et al. |
| 6,920,611 B1 | 7/2005 | Spaeth et al. |
| 6,934,689 B1 | 8/2005 | Ritter et al. |
| 6,965,992 B1 | 11/2005 | Joseph et al. |
| 6,975,852 B1 | 12/2005 | Sofer et al. |
| 6,990,330 B2 | 1/2006 | Veerepalli et al. |
| 7,003,497 B2 | 2/2006 | Maes |
| 7,007,840 B2 | 3/2006 | Davis |
| 7,013,286 B1 | 3/2006 | Aggarwal et al. |
| 7,025,256 B1 | 4/2006 | Drummond et al. |
| 7,028,906 B2 | 4/2006 | Challa et al. |
| 7,039,611 B2 | 5/2006 | Devine |
| 7,040,533 B1 | 5/2006 | Ramachandran |
| 7,051,923 B2 | 5/2006 | Nguyen et al. |
| 7,055,031 B2 | 5/2006 | Platt |
| 7,076,329 B1 | 7/2006 | Kolls |
| 7,089,208 B1 | 8/2006 | Levchin et al. |
| 7,099,850 B1 | 8/2006 | Mann, II et al. |
| 7,104,446 B2 | 9/2006 | Bortolin et al. |
| 7,107,250 B2 | 9/2006 | Harrison |
| 7,110,954 B2 | 9/2006 | Yung et al. |
| 7,121,456 B2 | 10/2006 | Spaeth et al. |
| 7,124,937 B2 | 10/2006 | Myers et al. |
| 7,136,835 B1 | 11/2006 | Flitcroft et al. |
| 7,150,393 B1 | 12/2006 | Drummond et al. |
| 7,152,780 B2 | 12/2006 | Gauthier et al. |
| 7,159,770 B2 | 1/2007 | Onozu |
| 7,194,437 B1 | 3/2007 | Britto et al. |
| 7,201,313 B1 | 4/2007 | Ramachandran |
| 7,203,300 B2 | 4/2007 | Shaffer et al. |
| 7,207,477 B1 | 4/2007 | Ramachandran |
| 7,231,357 B1 | 6/2007 | Shanman et al. |
| 7,231,372 B1 | 6/2007 | Prange et al. |
| RE39,736 E | 7/2007 | Morrill, Jr. |
| 7,243,853 B1 | 7/2007 | Levy et al. |
| 7,257,545 B1 | 8/2007 | Hung |
| 7,280,981 B2 | 10/2007 | Huang et al. |
| 7,290,704 B1 | 11/2007 | Ball et al. |
| 7,308,254 B1 | 12/2007 | Rissanen |
| 7,343,149 B2 | 3/2008 | Benco et al. |
| 7,350,702 B2 | 4/2008 | Bortolin et al. |
| 7,353,187 B1 | 4/2008 | Emodi et al. |
| 7,356,516 B2 | 4/2008 | Richey et al. |
| 7,357,310 B2 | 4/2008 | Calabrese et al. |
| 7,407,094 B2 | 8/2008 | Myers et al. |
| 7,440,771 B2 | 10/2008 | Purk |
| 7,447,662 B2 | 11/2008 | Gibson |
| 7,464,867 B1 | 12/2008 | Kolls |
| 7,496,527 B2 | 2/2009 | Silverstein et al. |
| 7,500,606 B2 | 3/2009 | Park et al. |
| 7,580,873 B1 | 8/2009 | Silver et al. |
| 7,631,803 B2 | 12/2009 | Peyret et al. |
| 7,716,129 B1 | 5/2010 | Tan et al. |
| 7,945,240 B1 | 5/2011 | Klock et al. |
| 7,970,669 B1 | 6/2011 | Santos |
| 7,992,781 B2 | 8/2011 | Hammad |
| 8,019,365 B2 | 9/2011 | Fisher |
| 8,135,362 B2 | 3/2012 | LaDue |
| 8,170,527 B2 | 5/2012 | Granucci et al. |
| 8,977,567 B2 | 3/2015 | Aabye et al. |
| 9,672,508 B2 | 6/2017 | Aabye et al. |
| 9,824,355 B2 | 11/2017 | Aabye et al. |
| 10,037,523 B2 | 7/2018 | Aabye et al. |
| 2001/0013542 A1 | 8/2001 | Horowitz et al. |
| 2002/0013711 A1 | 1/2002 | Ahuja et al. |
| 2002/0065713 A1 | 5/2002 | Awada et al. |
| 2002/0073025 A1 | 6/2002 | Tanner et al. |
| 2002/0091569 A1 | 7/2002 | Kitaura et al. |
| 2002/0128903 A1 | 9/2002 | Kernahan |
| 2002/0161701 A1 | 10/2002 | Warmack |
| 2002/0165775 A1 | 11/2002 | Tagseth et al. |
| 2002/0190118 A1 | 12/2002 | Davenport et al. |
| 2002/0198777 A1 | 12/2002 | Yuasa |
| 2003/0004808 A1 | 1/2003 | Elhaoussine et al. |
| 2003/0058261 A1 | 3/2003 | Challa et al. |
| 2003/0120593 A1 | 6/2003 | Bansal et al. |
| 2003/0126078 A1 | 7/2003 | Vihinen |
| 2003/0144907 A1 | 7/2003 | Cohen, Jr. et al. |
| 2003/0149662 A1 | 8/2003 | Shore |
| 2003/0154139 A1 | 8/2003 | Woo |
| 2003/0172036 A1 | 9/2003 | Feigenbaum |
| 2003/0172040 A1 | 9/2003 | Kemper et al. |
| 2003/0212595 A1 | 11/2003 | Antonucci |
| 2003/0212601 A1 | 11/2003 | Silva et al. |
| 2003/0212642 A1 | 11/2003 | Weller et al. |
| 2003/0220835 A1 | 11/2003 | Barnes, Jr. |
| 2003/0225618 A1 | 12/2003 | Hessburg et al. |
| 2003/0229588 A1 | 12/2003 | Falk et al. |
| 2003/0230630 A1 | 12/2003 | Whipple et al. |
| 2003/0233292 A1 | 12/2003 | Richey et al. |
| 2004/0019522 A1 | 1/2004 | Bortolin et al. |
| 2004/0030601 A1 | 2/2004 | Pond et al. |
| 2004/0038690 A1 | 2/2004 | Lee et al. |
| 2004/0044621 A1 | 3/2004 | Huang et al. |
| 2004/0049455 A1 | 3/2004 | Mohsenzadeh |
| 2004/0050922 A1 | 3/2004 | Gauthier et al. |
| 2004/0054575 A1 | 3/2004 | Marshall |
| 2004/0054581 A1 | 3/2004 | Redford et al. |
| 2004/0054590 A1 | 3/2004 | Redford et al. |
| 2004/0054591 A1 | 3/2004 | Spaeth et al. |
| 2004/0063494 A1 | 4/2004 | Oram et al. |
| 2004/0064406 A1 | 4/2004 | Yates et al. |
| 2004/0078243 A1 | 4/2004 | Fisher |
| 2004/0117254 A1 | 6/2004 | Nemirofsky et al. |
| 2004/0133653 A1 | 7/2004 | Defosse et al. |
| 2004/0139021 A1 | 7/2004 | Reed et al. |
| 2004/0148224 A1 | 7/2004 | Gauthier et al. |
| 2004/0153715 A1 | 8/2004 | Spaeth et al. |
| 2004/0186770 A1 | 9/2004 | Pettit et al. |
| 2004/0199470 A1 | 10/2004 | Ferry, Jr. et al. |
| 2004/0220964 A1 | 11/2004 | Shiftan et al. |
| 2004/0243519 A1 | 12/2004 | Perttila et al. |
| 2004/0249712 A1 | 12/2004 | Brown et al. |
| 2004/0254848 A1 | 12/2004 | Golan et al. |
| 2004/0260653 A1 | 12/2004 | Tsuei et al. |
| 2004/0267618 A1 | 12/2004 | Judicibus et al. |
| 2005/0021456 A1 | 1/2005 | Steele et al. |
| 2005/0029344 A1 | 2/2005 | Davis |
| 2005/0033688 A1 | 2/2005 | Peart et al. |
| 2005/0035847 A1 | 2/2005 | Bonalle et al. |
| 2005/0036611 A1 | 2/2005 | Seaton, Jr. et al. |
| 2005/0045718 A1 | 3/2005 | Bortolin et al. |
| 2005/0058427 A1 | 3/2005 | Nguyen et al. |
| 2005/0071225 A1 | 3/2005 | Bortolin et al. |
| 2005/0071226 A1 | 3/2005 | Nguyen et al. |
| 2005/0071227 A1 | 3/2005 | Hammad et al. |
| 2005/0071228 A1 | 3/2005 | Bortolin et al. |
| 2005/0071235 A1 | 3/2005 | Nguyen et al. |
| 2005/0075958 A1 | 4/2005 | Gonzalez |
| 2005/0097473 A1 | 5/2005 | Malik et al. |

(56) References Cited

U.S. PATENT DOCUMENTS

| | | |
|---|---|---|
| 2005/0102233 A1 | 5/2005 | Park et al. |
| 2005/0102234 A1 | 5/2005 | Devine |
| 2005/0121506 A1 | 6/2005 | Gauthier et al. |
| 2005/0131838 A1 | 6/2005 | Woodward |
| 2005/0149455 A1 | 7/2005 | Bruesewitz et al. |
| 2005/0154674 A1 | 7/2005 | Nicholls et al. |
| 2005/0165864 A1 | 7/2005 | Martino |
| 2005/0171898 A1 | 8/2005 | Bishop et al. |
| 2005/0177510 A1 | 8/2005 | Hilt et al. |
| 2005/0187873 A1 | 8/2005 | Labrou et al. |
| 2005/0199714 A1 | 9/2005 | Brandt et al. |
| 2005/0203856 A1 | 9/2005 | Russell |
| 2005/0210387 A1 | 9/2005 | Alagappan et al. |
| 2005/0213766 A1 | 9/2005 | Goss |
| 2005/0219061 A1 | 10/2005 | Lai et al. |
| 2005/0222933 A1 | 10/2005 | Wesby |
| 2005/0222949 A1 | 10/2005 | Inotay et al. |
| 2005/0283416 A1 | 12/2005 | Reid et al. |
| 2005/0283430 A1 | 12/2005 | Reid et al. |
| 2005/0283431 A1 | 12/2005 | Reid et al. |
| 2005/0283432 A1 | 12/2005 | Reid et al. |
| 2005/0283433 A1 | 12/2005 | Reid et al. |
| 2006/0053056 A1 | 3/2006 | Alspach-Goss et al. |
| 2006/0059110 A1 | 3/2006 | Madhok et al. |
| 2006/0080243 A1 | 4/2006 | Kemper et al. |
| 2006/0085260 A1 | 4/2006 | Yamagishi |
| 2006/0111967 A1 | 5/2006 | Forbes |
| 2006/0155644 A1 | 7/2006 | Reid et al. |
| 2006/0163345 A1 | 7/2006 | Myers et al. |
| 2006/0178957 A1 | 8/2006 | LeClaire |
| 2006/0179007 A1 | 8/2006 | Davis |
| 2006/0202025 A1 | 9/2006 | Calabrese et al. |
| 2006/0206376 A1 | 9/2006 | Gibbs et al. |
| 2006/0218086 A1 | 9/2006 | Campbell et al. |
| 2006/0224449 A1 | 10/2006 | Byerley et al. |
| 2006/0247981 A1 | 11/2006 | Singh et al. |
| 2006/0248007 A1 | 11/2006 | Hofer et al. |
| 2006/0253390 A1 | 11/2006 | McCarthy et al. |
| 2006/0270421 A1 | 11/2006 | Phillips et al. |
| 2006/0273163 A1 | 12/2006 | Gusler et al. |
| 2006/0282382 A1 | 12/2006 | Balasubramanian et al. |
| 2006/0290501 A1 | 12/2006 | Hammad et al. |
| 2006/0293027 A1 | 12/2006 | Hammad et al. |
| 2007/0001000 A1 | 1/2007 | Nguyen et al. |
| 2007/0001001 A1 | 1/2007 | Myers et al. |
| 2007/0005492 A1 | 1/2007 | Kim |
| 2007/0005613 A1 | 1/2007 | Singh et al. |
| 2007/0005774 A1 | 1/2007 | Singh et al. |
| 2007/0012764 A1 | 1/2007 | Bortolin et al. |
| 2007/0017970 A1 | 1/2007 | Gauthier et al. |
| 2007/0022058 A1 | 1/2007 | Labrou et al. |
| 2007/0034679 A1 | 2/2007 | Gauthier et al. |
| 2007/0055597 A1 | 3/2007 | Patel et al. |
| 2007/0055630 A1 | 3/2007 | Gauthier et al. |
| 2007/0057034 A1 | 3/2007 | Gauthier et al. |
| 2007/0057051 A1 | 3/2007 | Bortolin et al. |
| 2007/0078761 A1 | 4/2007 | Kagan et al. |
| 2007/0083465 A1 | 4/2007 | Ciurea et al. |
| 2007/0100691 A1 | 5/2007 | Patterson |
| 2007/0101411 A1 | 5/2007 | Babi et al. |
| 2007/0125842 A1 | 6/2007 | Antoo et al. |
| 2007/0150387 A1 | 6/2007 | Seubert et al. |
| 2007/0156436 A1 | 7/2007 | Fisher et al. |
| 2007/0194104 A1 | 8/2007 | Fukuda et al. |
| 2007/0194113 A1 | 8/2007 | Esplin et al. |
| 2007/0203836 A1 | 8/2007 | Dodin |
| 2007/0205270 A1 | 9/2007 | Kemper et al. |
| 2007/0241189 A1 | 10/2007 | Slavin et al. |
| 2007/0243856 A1 | 10/2007 | Fougnies et al. |
| 2007/0244811 A1 | 10/2007 | Tumminaro |
| 2007/0250380 A1 | 10/2007 | Mankoff |
| 2007/0276764 A1 | 11/2007 | Mann, III et al. |
| 2007/0288373 A1 | 12/2007 | Wilkes |
| 2008/0003987 A1 | 1/2008 | Mechaley |
| 2008/0006685 A1 | 1/2008 | Rackley, III et al. |
| 2008/0010193 A1 | 1/2008 | Rackley, III et al. |
| 2008/0021784 A1 | 1/2008 | Hessburg et al. |
| 2008/0040265 A1 | 2/2008 | Rackley, III et al. |
| 2008/0058014 A1 | 3/2008 | Khan et al. |
| 2008/0064383 A1 | 3/2008 | Nath et al. |
| 2008/0114657 A1 | 5/2008 | Forzley |
| 2008/0116264 A1 | 5/2008 | Hammad et al. |
| 2008/0118069 A1 | 5/2008 | Yang |
| 2008/0120182 A1 | 5/2008 | Arnold et al. |
| 2008/0120703 A1 | 5/2008 | Morris et al. |
| 2008/0126145 A1 | 5/2008 | Rackley, III et al. |
| 2008/0133366 A1 | 6/2008 | Evans et al. |
| 2008/0133409 A1 | 6/2008 | Eastley et al. |
| 2008/0147546 A1 | 6/2008 | Weichselbaumer et al. |
| 2008/0154727 A1 | 6/2008 | Carlson |
| 2008/0154735 A1 | 6/2008 | Carlson |
| 2008/0154772 A1 | 6/2008 | Carlson |
| 2008/0163257 A1 | 7/2008 | Carlson et al. |
| 2008/0167017 A1 | 7/2008 | Wentker et al. |
| 2008/0167988 A1 | 7/2008 | Sun et al. |
| 2008/0167991 A1 | 7/2008 | Carlson et al. |
| 2008/0183480 A1 | 7/2008 | Carlson et al. |
| 2008/0201226 A1 | 8/2008 | Carlson et al. |
| 2008/0208681 A1 | 8/2008 | Hammad et al. |
| 2008/0208741 A1 | 8/2008 | Arthur et al. |
| 2008/0208762 A1 | 8/2008 | Arthur et al. |
| 2008/0228611 A1 | 9/2008 | Lilly et al. |
| 2008/0270246 A1 | 10/2008 | Chen |
| 2008/0288404 A1 | 11/2008 | Pirzadeh et al. |
| 2008/0300973 A1 | 12/2008 | DeWitt et al. |
| 2008/0313047 A1 | 12/2008 | Casares et al. |
| 2008/0319843 A1 | 12/2008 | Moser et al. |
| 2009/0012886 A1 | 1/2009 | Allin et al. |
| 2009/0016538 A1 | 1/2009 | Drudis et al. |
| 2009/0018954 A1 | 1/2009 | Roberts |
| 2009/0076896 A1 | 3/2009 | DeWitt et al. |
| 2009/0076925 A1 | 3/2009 | DeWitt et al. |
| 2009/0078777 A1 | 3/2009 | Granucci et al. |
| 2009/0081989 A1 | 3/2009 | Wuhrer |
| 2009/0083159 A1 | 3/2009 | Maw |
| 2009/0084840 A1 | 4/2009 | Williams et al. |
| 2009/0094125 A1 | 4/2009 | Killian et al. |
| 2009/0098825 A1 | 4/2009 | Huomo et al. |
| 2009/0106551 A1 | 4/2009 | Boren et al. |
| 2009/0112721 A1 | 4/2009 | Hammad et al. |
| 2009/0112765 A1 | 4/2009 | Skowronek |
| 2009/0119170 A1 | 5/2009 | Hammad et al. |
| 2009/0143104 A1 | 6/2009 | Loh et al. |
| 2009/0182634 A1 | 7/2009 | Park et al. |
| 2009/0193253 A1 | 7/2009 | Falk et al. |
| 2009/0202081 A1 | 8/2009 | Hammad et al. |
| 2009/0314840 A1 | 12/2009 | Granucci et al. |
| 2010/0030651 A1 | 2/2010 | Matotek et al. |
| 2010/0042540 A1 | 2/2010 | Graves et al. |
| 2010/0057620 A1 | 3/2010 | Li et al. |
| 2010/0211498 A1 | 8/2010 | Aabye et al. |
| 2010/0211504 A1 | 8/2010 | Aabye et al. |
| 2010/0211507 A1 | 8/2010 | Aabye et al. |
| 2010/0217709 A1 | 8/2010 | Aabye et al. |
| 2011/0112964 A1 | 5/2011 | Berntsen et al. |
| 2011/0119184 A1 | 5/2011 | Singhal |
| 2011/0161182 A1 | 6/2011 | Racco |
| 2011/0161230 A1 | 6/2011 | Singh |
| 2011/0225075 A1 | 9/2011 | Maw et al. |
| 2011/0276511 A1 | 11/2011 | Rosenberg |
| 2012/0029990 A1 | 2/2012 | Fisher |
| 2012/0203646 A1 | 8/2012 | Morgan et al. |
| 2013/0060647 A1 | 3/2013 | Aabye et al. |
| 2013/0060706 A1 | 3/2013 | Aabye et al. |
| 2014/0040052 A1 | 2/2014 | Arthur et al. |
| 2014/0201084 A1* | 7/2014 | Dagenais ............... G06Q 20/40 705/64 |
| 2015/0213560 A1 | 7/2015 | Aabye et al. |

(56) References Cited

U.S. PATENT DOCUMENTS

| | | | |
|---|---|---|---|
| 2017/0069028 A1* | 3/2017 | Narayana | G06Q 40/06 |
| 2017/0364913 A1 | 12/2017 | Aabye et al. | |

FOREIGN PATENT DOCUMENTS

| | | |
|---|---|---|
| EP | 1280115 | 1/2003 |
| EP | 1772832 | 4/2007 |
| EP | 2340519 | 7/2011 |
| EP | 2340519 | 4/2012 |
| GB | 2348781 | 11/2003 |
| HK | 1184584 | 1/2014 |
| KR | 200276208 | 5/2002 |
| KR | 100773918 | 11/2007 |
| KR | 100914513 | 9/2009 |
| KR | 101039696 | 6/2011 |
| KR | 101092657 | 12/2011 |
| KR | 101138938 | 4/2012 |
| KR | 101184865 | 9/2012 |
| KR | 101195182 | 10/2012 |
| MX | 323011 | 8/2014 |
| RU | 2173505 | 9/2001 |
| RU | 2285294 | 10/2006 |
| WO | 9613814 | 5/1996 |
| WO | 9712461 | 4/1997 |
| WO | 9745814 | 12/1997 |
| WO | 9951038 | 10/1999 |
| WO | 0003328 | 1/2000 |
| WO | 0077697 | 12/2000 |
| WO | 2004077369 | 9/2004 |
| WO | 2005052869 | 6/2005 |
| WO | 2006024080 | 3/2006 |
| WO | 2007121587 | 11/2007 |
| WO | 2007145540 | 12/2007 |
| WO | 2010033968 | 3/2010 |
| WO | 2010033970 | 3/2010 |
| WO | 2016062890 | 4/2016 |

OTHER PUBLICATIONS

U.S. Appl. No. 12/563,410 , "Non-Final Office Action", dated Mar. 6, 2014, 16 pages.
U.S. Appl. No. 12/563,410 , "Non-Final Office Action", dated Nov. 28, 2011, 9 pages.
U.S. Appl. No. 12/563,421 , "Notice of Allowance", dated Feb. 19, 2020, 8 pages.
U.S. Appl. No. 12/563,421 , "Notice of Allowance", dated Jan. 15, 2020, 8 pages.
U.S. Appl. No. 12/563,430 , "Final Office Action", dated Sep. 26, 2012, 39 pages.
U.S. Appl. No. 12/563,430 , "Non-Final Office Action", dated Mar. 15, 2012, 36 pages.
U.S. Appl. No. 12/563,444 , "Final Office Action", dated Jul. 25, 2012, 10 pages.
U.S. Appl. No. 12/563,444 , "Non Final Office Action", dated Nov. 1, 2016, 19 pages.
U.S. Appl. No. 12/563,444 , "Non-Final Office Action", dated Feb. 8, 2012, 8 pages.
U.S. Appl. No. 12/563,444 , "Notice of Allowance", dated Jun. 7, 2017, 20 pages.
U.S. Appl. No. 13/662,843 , "Restriction Requirement", dated Aug. 10, 2015, 5 pages.
AU2009292921 , "First Examination Report", dated Jul. 9, 2014, 3 pages.
AU2016213707 , "First Examination Report", dated Sep. 27, 2017, 3 pages.
AU2016213707 , "Fourth Examination Report", dated Sep. 27, 2018, 3 pages.
AU2016213707 , "Second Examination Report", dated Feb. 13, 2018, 4 pages.
AU2016213707 , "Third Examination Report", dated Aug. 8, 2018, 4 pages.
CA2,738,046 , "Notice of Allowance", dated Sep. 21, 2017, 1 page.
CA2,738,046 , "Office Action", dated Sep. 26, 2016, 4 pages.
CA2,965,145 , "Office Action", dated Feb. 8, 2018, 4 pages.
EP09815367.9 , "Extended European Search Report", dated Jun. 19, 2013, 12 pages.
EP09815367.9 , "Office Action", dated Apr. 22, 2014, 13 pages.
EP09815368.7 , "Office Action", dated Sep. 25, 2013, 4 pages.
EP09815368.7 , "Summons to Attend Oral Proceedings", dated Jun. 11, 2015, 6 pages.
EP13160698.0 , "Extended European Search Report", dated Aug. 14, 2013, 8 pages.
MX/A/2011/003056 , "Office Action", dated Apr. 30, 2014, 4 pages.
MX/A/2011/003059 , "Office Action", dated Mar. 4, 2014, 6 pages.
MX/A/2011/003060 , "Notice of Allowance", dated Jul. 4, 2014, 1 page.
MX/A/2011/003060 , "Office Action", dated Feb. 14, 2014, 2 pages.
MX/A/2011/003060 , "Office Action", dated Oct. 16, 2013, 5 pages.
PCT/US2009/057791 , "International Preliminary Report on Patentability", dated Mar. 31, 2011, 7 pages.
PCT/US2009/057791 , "International Search Report and Written Opinion", dated Nov. 9, 2009, 7 pages.
PCT/US2009/057794 , "International Preliminary Report on Patentability", dated Mar. 31, 2011, 8 pages.
PCT/US2009/057794 , "International Search Report and Written Opinion", dated Jan. 8, 2010, 12 pages.
PCT/US2009/057794 , "Invitation to Pay Additional Fees and, Where Applicable, Protest Fee", dated Nov. 13, 2009, 2 pages.
PCT/US2009/057799 , "International Preliminary Report on Patentability", dated Mar. 31, 2011, 8 pages.
PCT/US2009/057799 , "International Search Report and Written Opinion", dated Nov. 10, 2009, 8 pages.
PCT/US2009/057802 , "International Preliminary Report on Patentability", dated Mar. 31, 2011, 7 pages.
PCT/US2009/057802 , "International Search Report and Written Opinion", dated Nov. 19, 2009, 8 pages.
RU2011113671 , "Notice of Allowance", dated May 12, 2014, 12 pages.
RU2011113671 , "Office Action", dated Oct. 4, 2013, 6 pages.
RU2011115355 , "Notice of Allowance", dated Sep. 18, 2014, 11 pages.
RU2011115355 , "Office Action", dated Sep. 5, 2013, 10 pages.
RU2011115355 , "Office Action", dated Apr. 25, 2014, 3 pages.
RU2011131696 , "Notice of Allowance", dated Feb. 26, 2015, 11 pages.
U.S. Appl. No. 15/586,169 , "Non-Final Office Action", dated Oct. 21, 2019, 8 pages.
Introduction to Public Key Infrastructure (PKI), Available Online at https://web.archive.org/web/20040826082243/http://www.articsoft.com/public_key_infrastructure.htm, Aug. 26, 2004, 6 pages.
Proximity Mobile Payments: Leveraging NFC and the Contactless Financial Payments Infrastructure, A Smart Card Alliance Contactless Payments Council White Paper, Smart Card Alliance, Available Online at www.smartcardalliance.org, Sep. 2007, pp. 1-39.
U.S. Appl. No. 12/563,410, Final Office Action dated Dec. 26, 2014, 13 pages.
U.S. Appl. No. 12/563,410, Non-Final Office Action dated Sep. 4, 2014, 12 pages.
U.S. Appl. No. 12/563,421, Advisory Action dated Apr. 8, 2015, 4 pages.
U.S. Appl. No. 12/563,421, Final Office Action dated Oct. 30, 2012, 17 pages.
U.S. Appl. No. 12/563,421, Final Office Action dated Dec. 21, 2015, 19 pages.
U.S. Appl. No. 12/563,421, Final Office Action dated Jan. 16, 2015, 22 pages.
U.S. Appl. No. 12/563,421, Final Office Action dated Sep. 4, 2014, 22 pages.
U.S. Appl. No. 12/563,421, Non-Final Office Action dated Mar. 30, 2012, 18 pages.
U.S. Appl. No. 12/563,421, Non-Final Office Action dated Jan. 10, 2014, 19 pages.
U.S. Appl. No. 12/563,421, Non-Final Office Action dated Dec. 1, 2016, 20 pages.

(56) References Cited

OTHER PUBLICATIONS

U.S. Appl. No. 12/563,421, Non-Final Office Action dated Jun. 5, 2015, 22 pages.
U.S. Appl. No. 12/563,421, Restriction Requirement dated Dec. 29, 2011, 6 pages.
U.S. Appl. No. 12/563,430, Non-Final Office Action dated Jun. 19, 2014, 50 pages.
U.S. Appl. No. 12/563,430, Notice of Allowance dated Oct. 29, 2014, 21 pages.
U.S. Appl. No. 12/563,444, Final Office Action dated Jun. 29, 2015, 7 pages.
U.S. Appl. No. 12/563,444, Non-Final Office Action dated Jun. 17, 2014, 13 pages.
U.S. Appl. No. 12/563,444, Non-Final Office Action dated Dec. 11, 2014, 5 pages.
U.S. Appl. No. 13/662,371, Advisory Action dated Sep. 1, 2016, 3 pages.
U.S. Appl. No. 13/662,371, Final Office Action dated Dec. 26, 2014, 15 pages.
U.S. Appl. No. 13/662,371, Final Office Action dated Apr. 27, 2016, 16 pages.
U.S. Appl. No. 13/662,371, Non-Final Office Action dated Aug. 1, 2014, 11 pages.
U.S. Appl. No. 13/662,371, Non-Final Office Action dated Sep. 11, 2015, 13 pages.
U.S. Appl. No. 13/662,371, Non-Final Office Action dated Apr. 20, 2015, 14 pages.
U.S. Appl. No. 13/662,371, Notice of Allowance dated Mar. 29, 2018, 7 pages.
U.S. Appl. No. 13/662,371, Notice of Allowance dated Feb. 8, 2017, 8 pages.
U.S. Appl. No. 13/662,843, Final Office Action dated Sep. 9, 2016, 12 pages.
U.S. Appl. No. 13/662,843, Non-Final Office Action dated Jan. 21, 2016, 9 pages.
U.S. Appl. No. 13/662,843, Notice of Allowance dated Feb. 3, 2017, 10 pages.
Australian Application No. 2009292921, Second Examination Report dated Oct. 29, 2014, 3 pages.
Australian Application No. 2009292922, First Examination Report dated Jul. 25, 2014, 4 pages.
Australian Application No. 2009292922, Fourth Examination Report dated Jan. 21, 2016, 5 pages.
Australian Application No. 2009292922, Notice of Acceptance dated May 2, 2016, 3 pages.
Australian Application No. 2009292922, Second Examination Report dated Feb. 3, 2015, 3 pages.
Australian Application No. 2009292922, Third Examination Report dated Aug. 27, 2015, 6 pages.
Australian Application No. 2009292926, First Examination Report dated Jul. 3, 2014, 3 pages.
Canadian Application No. 2,738,046, Office Action dated Jul. 21, 2015, 3 pages.
Canadian Application No. 2,738,046, Notice of Allowance dated May 30, 2018, 1 page.
Canadian Application No. 2,965,145, Notice of Allowance dated Feb. 7, 2019, 1 page.
European Application No. 13160698.0, Extended European Search Report dated Aug. 14, 2013, 8 pages.
European Application No. 09815368.7, Extended European Search Report dated Mar. 13, 2012, 6 pages.
European Application No. 09815372.9, Extended European Search Report dated Mar. 13, 2012, 7 pages.
Russian Application No. 2011131696, Office Action dated Oct. 16, 2013, 5 pages.
Russian Application No. 2011131696, Office Action dated Aug. 13, 2014, 9 pages (5 pages for the original document and 4 pages for the English translation).
Indian Application No. 2007/CHENP/2011, First Examination Report dated Sep. 27, 2018, 7 pages.
U.S. Appl. No. 15/586,169 , Final Office Action, dated Jun. 18, 2020, 11 pages.

* cited by examiner

OVER THE AIR UPDATE OF PAYMENT TRANSACTION DATA STORED IN SECURE MEMORY

CROSS REFERENCE TO RELATED APPLICATIONS

This application is a continuation application of U.S. application Ser. No. 13/662,371, filed Oct. 26, 2012, which is a divisional application of U.S. patent application Ser. No. 12/563,421, filed Sep. 21, 2009, which claims priority from U.S. Provisional Patent Application Nos. 61/099,060, filed Sep. 22, 2008, the contents of which are hereby incorporated in their entirety by reference for all purposes.

BACKGROUND

Embodiments of the present invention are directed to systems, apparatuses and methods for the processing of payment transactions, and more specifically, to a system and associated apparatus and method for processing a transaction that includes synchronizing transaction data stored in a device having a contactless element with transaction data maintained by an Issuer. The present invention is further directed to systems, apparatuses, and methods for using a contactless element such as an integrated circuit chip embedded in a wireless mobile device to enable payment transactions.

Consumer payment devices are used by millions of people worldwide to facilitate various types of commercial transactions. In a typical transaction involving the purchase of a product or service at a merchant location, the payment device is presented at a point of sale terminal ("POS terminal") located at a merchant's place of business. The POS terminal may be a card reader or similar device that is capable of accessing data stored on the payment device, where this data may include identification or authentication data, for example. Data read from the payment device is provided to the merchant's transaction processing system and then to the Acquirer, which is typically a bank or other institution that manages the merchant's account. The data provided to the Acquirer may then be provided to a payment processing network that is in communication with data processors that process the transaction data to determine if the transaction should be authorized by the network, and assist in the clearance and account settlement functions for the transaction. The authorization decision and clearance and settlement portions of the transaction may also involve communication and/or data transfer between the payment processing network and the bank or institution that issued the payment device to the consumer (the Issuer).

Although a consumer payment device may be a credit card or debit card, it may also take the form of a "smart" card or chip. A smart card is generally defined as a pocket-sized card (or other portable payment device) that is embedded with a microprocessor and one or more memory chips, or is embedded with one or more memory chips with non-programmable logic. The microprocessor type card typically can implement certain data processing functions, such as to add, delete, or otherwise manipulate information stored in a memory location on the card. In contrast, the memory chip type card (for example, a prepaid phone card) can typically only act as a file to hold data that is manipulated by a card reading device to perform a pre-defined operation, such as debiting a charge from a pre-established balance stored in the memory. Smart cards, unlike magnetic stripe cards (such as standard credit cards), can implement a variety of functions and contain a variety of types of information on the card. Therefore, in some applications they may not require access to remote databases for the purpose of user authentication or record keeping at the time of a transaction. A smart chip is a semiconductor device that is capable of performing most, if not all, of the functions of a smart card, but may be embedded in another device.

Smart cards or chips come in two general varieties; the contact type and the contactless type. A contact type smart card or chip is one that includes a physical element (e.g., a magnetic stripe) that enables access to the data and functional capabilities of the card, typically via some form of terminal or card reader. A contactless smart card or chip is a device that incorporates a means of communicating with the card reader or point of sale terminal without the need for direct physical contact. Thus, such devices may effectively be "swiped" (i.e., waved or otherwise presented in a manner that results in enabling communication between the contactless element and a reader or terminal) by passing them close to a card reader or terminal. Contactless cards or chips typically communicate with a card reader or terminal using RF (radio-frequency) technology, wherein proximity to the reader or terminal enables data transfer between the card or chip and the reader or terminal. Contactless cards have found uses in banking and other applications, where they have the advantage of not requiring removal from a user's wallet or pocket in order to participate in a transaction. A contactless card or chip may be embedded in, or otherwise incorporated into, a mobile device such as a mobile phone or personal digital assistant (PDA). Further, because of the growing interest in such cards, standards have been developed that govern the operation and interfaces for contactless smart cards, such as the ISO 14443 standard.

In a typical payment transaction, data is sent from a point of sale terminal to the Issuer to authenticate a consumer and obtain authorization for the transaction. As part of the authentication or authorization processes, the data may be accessed or processed by other elements of the transaction processing system (e.g., the merchant's Acquirer or a payment processor that is part of a payment processing network). Note that in some cases, authorization for the transaction may be obtained without connecting to the Issuer; this may be permitted by Issuer configured risk management parameters that have been set on the consumer's payment application or payment device. If the proposed transaction is authorized, then the consumer may provide other information to the merchant as part of completing the transaction. The Issuer or data processor may also send data back to the consumer. Such data may include an update to records of the transactions for which the payment device has been used, or to a current balance of an account associated with the device.

In the case of a transaction that uses a contactless element, a reader or point of sale terminal is typically only in communication with the contactless element for a short period of time (e.g., the amount of time needed for the element to be recognized by the reader and to provide data needed to initiate or conduct a portion of the transaction). This means that an Issuer or other party wishing to provide transaction related data to a consumer's payment device may be unable to effectively communicate with the consumer using the reader or point of sale terminal. This can create problems for a consumer who wishes to use the payment device for a later transaction, as the balance of a prepaid card or balance of a credit card or debit card account may be incorrect and affect the consumer's ability to obtain authorization for the later transaction. It may also cause a consumer wishing to access their account information to mistakenly think that they have either more or less funds available to them than they actually do.

What is desired is a system, apparatus and method for enabling transaction data stored on a payment device that utilizes a contactless smart chip to be updated without the contactless smart chip needing to communicate with a reader or point of sale terminal, and which overcomes the noted disadvantages of current approaches. Embodiments of the invention address these problems and other problems individually and collectively.

BRIEF SUMMARY

Embodiments of the present invention are directed to a system, apparatus, and method for using a contactless element (such as a contactless smart chip) as part of a payment transaction. Specifically, embodiments of the present invention are directed to facilitating the update or synchronization of transaction data and transaction records stored in a memory that is part of a payment device (such as a mobile phone), where the device includes a contactless element. The inventive system, apparatus and method can be implemented using a contactless smart chip and a wireless data transfer element (e.g., a near field communications (NFC) capability, etc.) embedded within a mobile wireless device. The mobile device may be a mobile phone, PDA, MP3 player or the like. The smart chip or other type of contactless element can be integrated with the circuitry of the mobile device to permit data stored on the chip to be accessed and manipulated (e.g., read, written, erased) using the wireless communications network as a data transport or command transport channel. In this way, transaction data provided by an Issuer may be provided to the payment device in the absence of communication between the payment device and a near field communications device reader or point of sale terminal.

This permits the Issuer to update transaction data and/or synchronize data or records stored in the payment device with those maintained by the Issuer when the contactless element is not in the proximity of the device reader or terminal. This capability is particularly useful in the case of a prepaid balance being stored in the payment device, since without an accurate balance, a user may be prevented from completing a transaction that they should be entitled to complete. Similarly, a credit or debit account balance stored in the payment device may be updated to properly reflect the status of the account in a situation where the data stored after interaction between the contactless element and reader or terminal was incorrect or incomplete.

In one embodiment, the present invention is directed to a mobile device for use in conducting a payment transaction, where the mobile device includes a processor, a memory, and a set of instructions stored in the memory, which when executed by the processor implement a method to conduct the payment transaction by communicating with a point of sale terminal using a near field communications mechanism of the mobile device, and receive data related to the payment transaction at the mobile device using a cellular communications network, wherein the received data related to the payment transaction is an update to data stored in the mobile device as a result of communicating with the point of sale terminal.

In another embodiment, the present invention is directed to a data processing device, where the data processing device includes a processor, a memory, and a set of instructions stored in the memory, which when executed by the processor implement a method to receive data for a payment transaction from a point of sale terminal, wherein at least some of the data is provided to the point of sale terminal by a mobile device that communicates with the point of sale terminal using a near field communications mechanism, process the received data to generate a record of the transaction, wherein the record of the transaction includes an update to data stored in the mobile device as a result of communicating with the point of sale terminal, and provide the record of the transaction to an element of a wireless communications system, thereby causing the record of the transaction to be provided to the mobile device over a wireless network.

In yet another embodiment, the present invention is directed to a method of conducting a payment transaction, where the method includes communicating with a point of sale terminal using a near field communications mechanism of a payment device as part of the payment transaction, wherein the payment device includes a contactless element and is contained in a mobile phone, and receiving data to update a record of the payment transaction contained in the mobile phone using a cellular phone communications network.

In yet another embodiment, the present invention is directed to an apparatus for facilitating payment transactions between a plurality of consumers and a plurality of merchants, where the apparatus includes a processor, a memory, and a set of instructions stored in the memory, which when executed by the processor implement a method to generate a first pair of encryption keys, the first pair of encryption keys including a first encryption key and a second encryption key, generate a second pair of encryption keys, the second pair of encryption keys including a first encryption key and a second encryption key, distribute the first pair of encryption keys to a first mobile gateway, the first mobile gateway configured to process a first set of payment transactions, and distribute the second pair of encryption keys to a second mobile gateway, the second mobile gateway configured to process a second set of payment transactions, wherein the first set of transactions is different from the second set of transactions.

Other objects and advantages of the present invention will be apparent to one of ordinary skill in the art upon review of the detailed description of the present invention and the included figures.

DETAILED DESCRIPTION

Embodiments of the present invention are directed to a system, apparatus, and method for processing payment transactions that are conducted using a mobile device that includes a contactless element, such as an integrated circuit chip. The invention enables the updating, correction or synchronization of transaction data maintained by an Issuer with that stored on the device. This is accomplished by using a wireless (cellular) network as a data communication channel for data provided by an Issuer to the mobile device, and is particularly advantageous in circumstances in which the contactless element is not presently capable of communication with a device reader or point of sale terminal that uses a near field communications mechanism. In some embodiments, data transferred between the mobile device and Issuer (i.e., either from the device to the Issuer or from the Issuer to the device) may be encrypted and decrypted (e.g., using "keys" such, as public key infrastructure (PKI) keys or symmetric keys) to provide additional security and protect the data from being accessed by other users or applications. If encryption keys are used for the encryption and decryption processes, they may be distributed by a key distribution server or other suitable entity to a mobile gateway which participates in the data encryption and decryption operations.

The present invention is typically implemented in the context of a payment transaction; therefore prior to describing one or more embodiments of the invention in greater detail, a brief discussion of the entities involved in processing and authorizing a payment transaction, and their roles in the authorization process will be presented.

Figure 1:
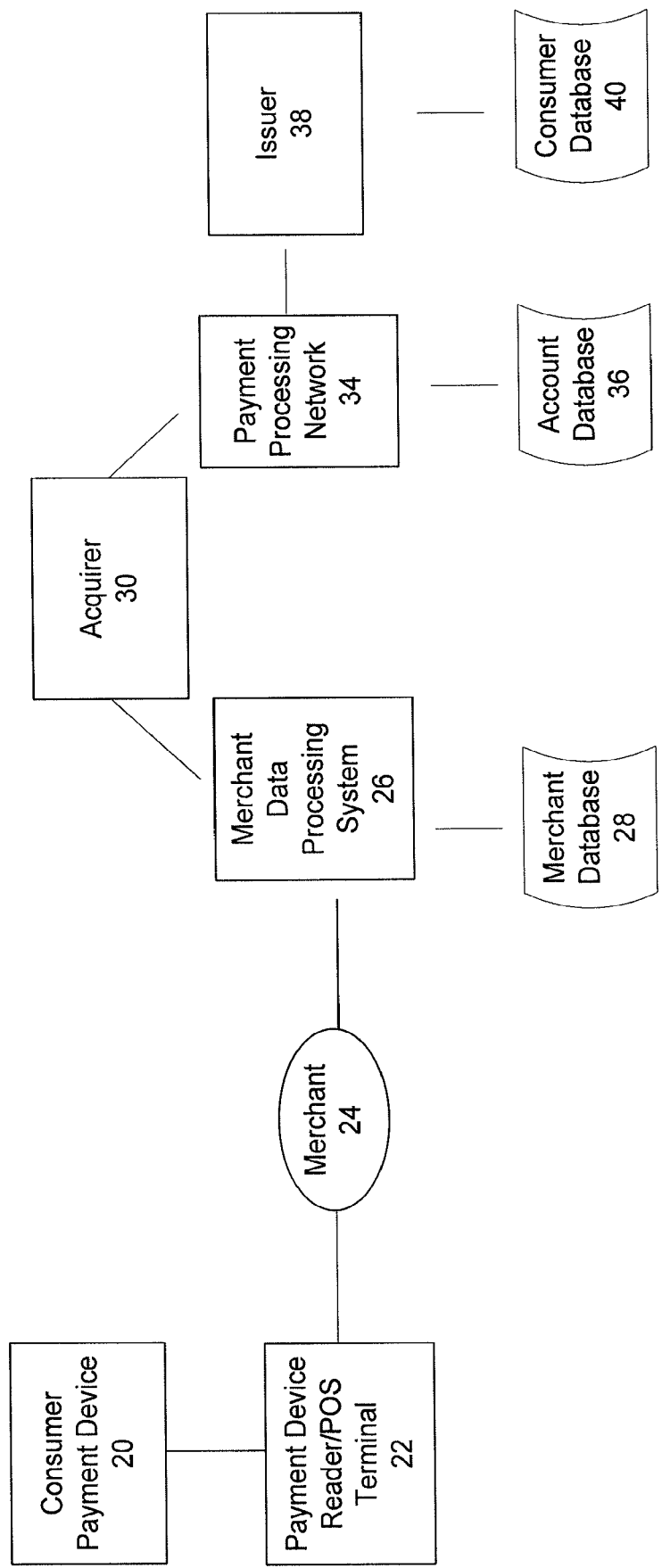
FIG. 1 is a block diagram illustrating a transaction processing system that may be used with some embodiments of the present invention.

FIG. 1 is a block diagram illustrating a transaction processing system that may be used with some embodiments of the present invention. Typically, an electronic payment transaction is authorized if the consumer conducting the transaction is properly authenticated (i.e., their identity and their valid use of a payment account is verified) and has sufficient funds or credit to conduct the transaction. Conversely, if there are insufficient funds or credit in the consumer's account, or if the consumer's payment device is on a negative list (e.g., it is indicated as possibly having been stolen), then an electronic payment transaction may not be authorized. In the following description, an "Acquirer" is typically a business entity (e.g., a commercial bank) that has a business relationship with a particular merchant. An "Issuer" is typically a business entity (e.g., a bank) which issues a payment device such as a credit or debit card to a consumer. Some entities may perform both Issuer and Acquirer functions.

FIG. 1 illustrates the primary functional elements that are typically involved in processing a payment transaction and in the authorization process for such a transaction. As shown in FIG. 1, in a typical payment transaction, a consumer wishing to purchase a good or service from a merchant uses a portable consumer payment device 20 to provide payment transaction data that may be used as part of an authorization process. Portable consumer payment device 20 may be a debit card, credit card, smart card, mobile device containing a contactless chip, or other suitable form of device.

The portable consumer payment device is presented to a device reader or point of sale (POS) terminal 22 which is able to access data stored on or within the payment device. The account data (as well as any required consumer data) is communicated to the merchant 24 and ultimately to the merchant's transaction/data processing system 26. As part of the authorization process performed by the merchant, merchant transaction processing system 26 may access merchant database 28, which typically stores data regarding the customer/consumer (as the result of a registration process with the merchant, for example), the consumer's payment device, and the consumer's transaction history with the merchant. Merchant transaction processing system 26 typically communicates with Acquirer 30 (which manages the merchant's accounts) as part of the overall authorization process. Merchant transaction processing system 26 and/or Acquirer 30 provide data to Payment Processing Network 34, which among other functions, participates in the clearance and settlement processes that are part of the overall transaction processing. Communication and data transfer between Merchant transaction processing system 26 and Payment Processing Network 34 is typically by means of an intermediary, such as Acquirer 30. As part of the transaction authorization process, Payment Processing Network 34 may access account database 36, which typically contains information regarding the consumer's account payment history, chargeback or transaction dispute history, credit worthiness, etc. Payment Processing Network 34 communicates with Issuer 38 as part of the authorization process, where Issuer 38 is the entity that issued the payment device to the consumer and manages the consumer's account. Customer or consumer account data is typically stored in customer/consumer database 40 which may be accessed by Issuer 38 as part of the authentication, authorization or account management processes. Note that instead of, or in addition to being stored in account database 36, consumer account data may be included in, or otherwise part of customer/consumer database 40.

In standard operation, an authorization request message is created during a consumer purchase of a good or service at a point of sale (POS) using a portable consumer payment device (such as a credit or debit card). In some embodiments, the portable consumer payment device may be a wireless phone that incorporates a contactless card or chip. The contactless card or chip may communicate with the point of sale terminal using a near field communications (NFC) capability. The authorization request message is typically sent from the device reader/POS terminal 22 through the merchant's data processing system 26 to the merchant's Acquirer 30, to a payment processing network 34, and then to an Issuer 38. An "authorization request message" can include a request for authorization to conduct an electronic payment transaction. It may include one or more of an account holder's payment account number, currency code, sale amount, merchant transaction stamp, acceptor city, acceptor state/country, etc. An authorization request message may be protected using a secure encryption method (e.g., 128-bit SSL or equivalent) in order to prevent data from being compromised.

After the Issuer receives the authorization request message, the Issuer determines if the transaction should be authorized and sends an authorization response message back to the payment processing network to indicate whether or not the current transaction is authorized. The payment processing system then forwards the authorization response message to the Acquirer. The Acquirer then sends the response message to the Merchant. The Merchant is thus made aware of whether the Issuer has authorized the transaction, and hence whether the transaction can be completed.

At a later time, a clearance and settlement process may be conducted by elements of the payment/transaction processing system depicted in FIG. 1. A clearance process involves exchanging financial details between an Acquirer and an Issuer to facilitate posting a transaction to a consumer's account and reconciling the consumer's settlement position. Clearance and settlement can occur simultaneously or as separate processes.

Payment Processing Network 34 may include data processing subsystems, networks, and other means of implementing operations used to support and deliver authorization services, exception file services, and clearing and settlement services for payment transactions. An exemplary Payment Processing Network may include VisaNet. Payment Processing Networks such as VisaNet are able to process credit card transactions, debit card transactions, and other types of commercial transactions. VisaNet, in particular, includes a VIP system (Visa Integrated Payments system) which processes authorization requests and a Base II system which performs transaction clearing and settlement services.

Payment Processing Network 34 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment Processing Network 34 may use any suitable combination of wired or wireless networks, including the Internet, to permit communication and data transfer between network elements. Among other functions, Payment Processing Network 34 may be responsible for ensuring that a user is authorized to conduct the transaction (via an authentication process), confirm the identity of a party to a transaction (e.g., via receipt of a personal identification number), confirm a sufficient balance or credit line to permit a purchase, or reconcile the amount of a purchase with the user's account (via entering a record of the transaction amount, date, etc.).

Consumer payment device 20 may take one of many suitable forms. As mentioned, the portable consumer device can be a mobile device that incorporates a contactless element such as a chip for storing payment data (e.g., a BIN number, account number, etc.) and a near field communications (NFC) data transfer element such as an antenna, a light emitting diode, a laser, etc. The portable consumer device may also include a keychain device (such as the Speedpass™ commercially available from Exxon-Mobil Corp.), etc. The device containing the contactless card or chip, or other data storage element may be a cellular (mobile) phone, personal digital assistant (PDA), pager, transponder, or the like. The portable consumer device may also incorporate the ability to perform debit functions (e.g., a debit card), credit functions (e.g., a credit card), or stored value functions (e.g., a stored value or prepaid card).

In embodiments of the invention that include a contactless element (which may include a contactless chip and near field communications data transfer element) embedded within a wireless mobile phone or similar device, the contactless element can communicate with a Merchant's device reader or point of sale terminal using a short range communication method, such as a near field communications (NFC) capability. Examples of such NFC technologies or similar short range communications technologies include ISO standard 14443, RFID, Bluetooth™ and Infra-red communications methods.

Figure 2:
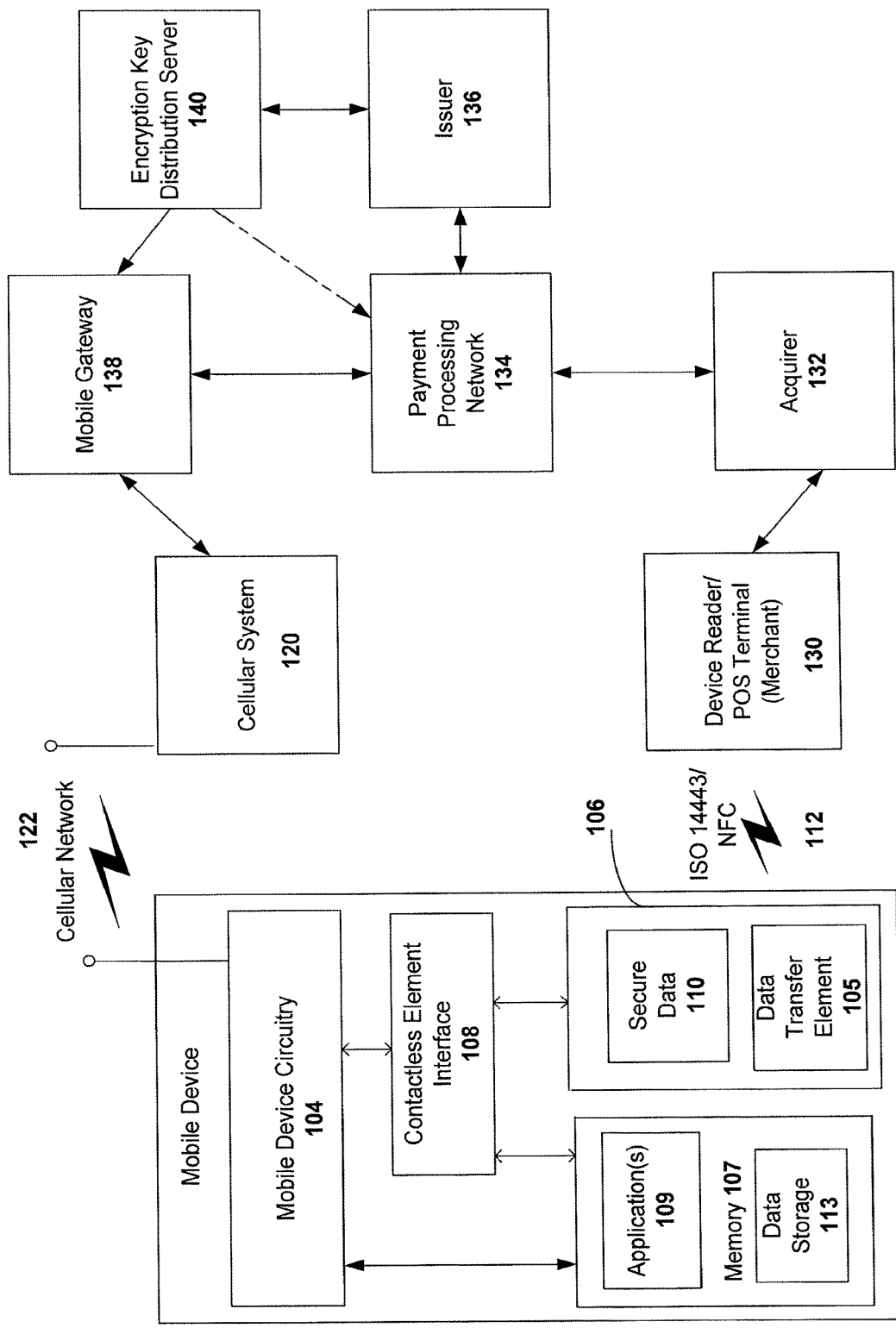
FIG. 2 is a functional block diagram illustrating the primary components of a system for updating or synchronizing transaction data for a transaction that uses a contactless element contained within a mobile device, in accordance with an embodiment of the present invention.

FIG. 2 is a functional block diagram illustrating the primary components of a system 100 for updating or synchronizing transaction data for a transaction that uses a contactless element contained within a mobile device, in accordance with an embodiment of the present invention. As shown in FIG. 1, system 100 includes a mobile device 102 having wireless communications capabilities 122. Mobile device 102 may be a wireless mobile telephone, PDA, laptop computer, pager, etc. In a typical embodiment, mobile device 102 is a cell phone, although as noted, implementation of the present invention is not limited to this embodiment. In the case of a cell phone as the mobile device 102, the device includes mobile device (cell phone) circuitry 104 that enables certain of the telephony functions. Among other functions, mobile device circuitry 104 enables mobile device 102 to communicate wirelessly with cellular system (i.e., a wireless carrier) 120 via cellular network 122.

Mobile device 102 further includes a contactless element 106, typically implemented in the form of a semiconductor chip. Contactless element 106 may include a secure data storage element 110, although secure data storage element 110 may also be implemented as a separate element from contactless element 106. Contactless element 106 includes a near field communications (NFC) data transfer (e.g., data transmission) element 105, such as an antenna or transducer. Contactless element 106 is typically embedded within and integrated with the elements of mobile device 102, and data or control instructions transmitted via cellular network 122 may be exchanged with or applied to contactless element 106 by means of contactless element interface 108. Contactless element interface 108 functions to permit the exchange of data and/or control instructions between mobile device circuitry 104 (and hence the cellular network) and contactless element 106. Thus, contactless element 106 may include data storage capability in the form of a memory or secure data storage 110 that may be accessed via interface 108 to permit the implementation of data read, write, and erase functions, for example.

Secure data storage 110 may be used by mobile device 102 to store operating parameters or other data utilized in the operation of the device. Secure data storage 110 may also be used to store other data for which enhanced security is desired, for example, transaction data, personal account data, identification data, authentication data, access control data for an application or device function, etc. As mentioned, secure data storage 110 may be implemented in the form of a chip that is separate and apart from contactless element 106, or alternatively, may be a section of memory in a chip that forms part of contactless element 106. Note also that the secure data storage and/or contactless element contained within the mobile device may be a removable element or may be integrated within the mobile device. Examples of removable elements include SIM cards, flash memory cards, and other suitable devices.

Mobile device 102 may also include one or more applications 109, where applications 109 are implemented in the form of one or more of software, firmware, or hardware. Applications 109 are used to implement various functions desired by a user, where such functions may include, but are not limited to, eCommerce transaction operations, transaction payment operations, etc. Typically, applications 109 represent processes or operations that are dedicated to a specific function that provides added value to the user and which are not part of the standard operation of the device (i.e., not part of enabling the standard telephony functions, for example). As shown in the figure, applications 109 may exchange data with secure data storage 110 (via contactless element interface 108) and may also be capable of exchanging data with mobile device circuitry 104. A typical application 109 for the purposes of the present invention is a payment application that enables a user to make a payment for a transaction, where the transaction is wholly or partially conducted using the mobile device. In such an example, secure data storage 110 may contain authentication data, user identification data, transaction record data, account balance data, etc. Applications 109 are typically stored as a set of executable instructions in memory 107, which may also include data storage 113. A processor accesses memory 107 to load and unload the instructions and data as needed to execute the instructions and perform the functions of the applications.

Contactless element 106 is capable of transferring and receiving data using data transfer element 105 which implements a near field communications capability 112, typically in accordance with a standardized protocol or data transfer mechanism (identified as ISO 14443/NFC in the figure). Near field communications capability 112 is a short-range communications capability; examples include the ISO 14443 standard, RFID, Bluetooth™, infra-red, or other data transfer capability that can be used to exchange data between the mobile device 102 and a device reader or point of sale terminal 130, which is typically located at a Merchant's place of business. Thus, mobile device 102 is capable of communicating and transferring data and/or control instructions via both cellular network 122 and near field communications capability 112.

System 100 further includes Acquirer 132 which is in communication with Merchant or Merchant's device reader or point of sale terminal 130. Acquirer 132 is in communication with Payment Processing Network 134 and as was described, may exchange data with Payment Processing Network 134 as part of the transaction authorization process. Payment Processing Network 134 is also in communication with Issuer 136. As was described, Issuer 136 may exchange data with Payment Processing Network 134 as part of a transaction authorization or transaction reconciliation process.

System 100 may also include Mobile Gateway 138, which is capable of coupling the cellular (wireless) network or system to a second network (typically a wireline network such as the Internet) and enabling the transfer of data between the networks. Mobile Gateway 138 may perform data processing operations as needed to permit the efficient transfer of data between the two types of networks, including, but not limited to, data reformatting or other processing to take into account differences in network protocols. Mobile Gateway 138 may also perform data processing operations to enable more efficient data transfer between the networks and devices coupled to each type of network, such as for purposes of improving the ability of a user to utilize the received data on a mobile device. As shown in the figure, in some embodiments, Mobile Gateway 138 is coupled to Payment Processing Network 134, which is coupled to Acquirer 130. Note that other embodiments are possible, such as where Mobile Gateway 138 is coupled to Issuer 136, as well as where Acquirer 130 is coupled to Issuer 136. Similarly, Issuer 136 may include the capability of functioning as Mobile Gateway 138.

System 100 may also include Encryption Key Distribution Server 140 which is capable of communication and data transfer with Mobile Gateway 138 and Issuer 136. As will be described, Encryption Key Distribution Server 140 may be used to distribute encryption keys to Mobile Gateway 138 and Issuer 136 for the purpose of enabling the encryption and decryption of transaction data that is transferred between the Issuer and the mobile device.

In some embodiments, payment processing network 134 may be configured to enable the transport of encrypted data; if so, then Encryption Key Distribution Server 140 may be capable of communication with payment processing network 134 for the purpose of distributing an encryption key to an element of that network (as suggested by the non-solid line connecting Key Server 140 to network 134). If payment processing network 134 is not configured to enable transport of encrypted data, then the data encryption/decryption processes may be performed in Mobile Gateway 138 in accordance with the encryption key(s) distributed by Encryption Key Distribution Server 140. Note that Issuer 136 may communicate with Encryption Key Distribution Server 140 to inform server 140 which of several mobile gateways it authorizes for purposes of communicating with mobile device 102, and hence to which mobile gateway a particular set of encryption keys should be distributed. Thus, Issuer 136 may select which of multiple available mobile gateways it chooses to authorize for purposes of communicating and exchanging transaction data with a particular mobile device.

Inventive system 100 provides an efficient way for a user to conduct a payment transaction using a contactless element. By integrating the contactless element with the mobile device's telephony communications capabilities, the cellular network may be used as a data transfer channel between an Issuer or Payment Processing Network element and the user's mobile device. In some embodiments, this arrangement may be used to facilitate the provision of data to the device for the purpose of synchronizing the transaction or account data stored in the mobile device with the data records maintained by the Issuer. Such data may include authentication and account management data, such as transaction records or account balances. For example, a secure data store (e.g., secure data storage 110 or a similar secure memory region that is part of the mobile device or the contactless element) may contain transaction records and a running total of the balance available for a user's account. In the case of the contactless element being used with a prepaid card or account, the balance would reflect the remaining amount of money available to a user. In the case of the contactless element being used with a credit or debit account, the balance would reflect a remaining credit limit or amount available from the debit account.

Embodiments of the present invention provide a mechanism for reconciling the data for the transaction records and/or account balances stored in the secure memory (or other data storage element) of the mobile device with that maintained by an Issuer. This ability is desirable (and may be necessary) when a contactless element is used for a transaction. This is because a contactless element is typically used as part of initiating a transaction, and to provide authentication, account identification, and account balance data to a Merchant. The contactless element is then typically removed from communication with the device reader or point of sale terminal. As a result, the contactless element is not available for later communication with the Issuer using the device reader or terminal to update, synchronize, or reconcile transaction records. However, as recognized by the inventors, such updating, synchronizing, or reconciling is desirable and can be accomplished by using the cellular network as a data transport mechanism between the Issuer (via Mobile Gateway 138, for example) and the mobile device.

Figure 3:
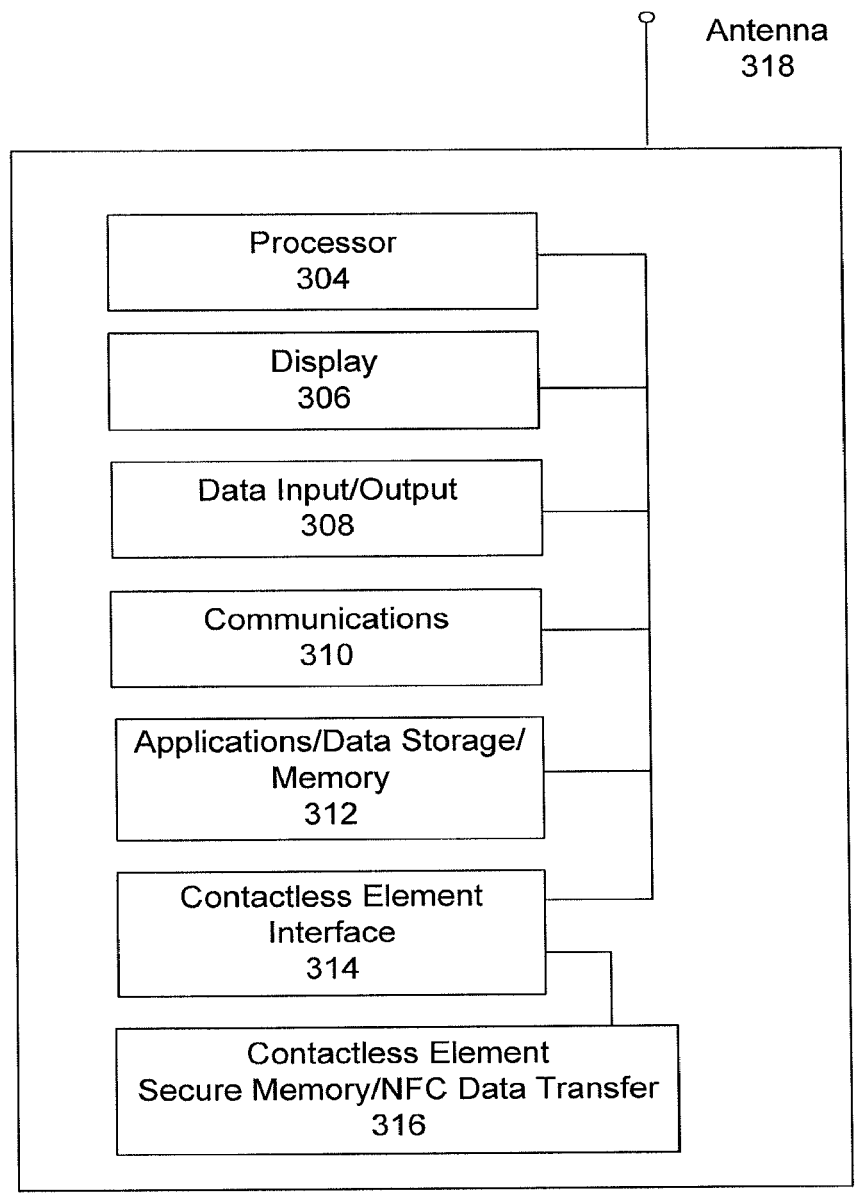
FIG. 3 is a functional block diagram illustrating the primary components of a mobile device, such as a mobile phone that may be used as part of the inventive system and method.

In embodiments of the present invention, mobile device 102 may be any device capable of communication and data transfer with a cellular network and a near field communication system. As noted, one example is a mobile wireless phone. FIG. 3 is a functional block diagram illustrating the primary components of a portable consumer device (e.g., element 102 of FIG. 2), such as a mobile phone that may be used as part of the inventive system and method. As illustrated in FIG. 3, mobile device 302 may include circuitry that is used to enable certain telephony and other device functions. The functional elements responsible for enabling those functions may include a processor 304 for executing instructions that implement the functions and operations of the device. Processor 304 may access data storage 312 (or another suitable memory region or element) to retrieve instructions or data used in executing the instructions. Data input/output elements 308 may be used to enable a user to input data (via a microphone or keyboard, for example) or receive output data (via a speaker, for example). Display 306 may also be used to output data to a user. Communications element 310 may be used to enable data transfer between device 302 and a wireless network (via antenna 318, for example) to assist in enabling telephony and data transfer functions. As described with reference to FIG. 2, device 302 may also include contactless element interface 314 to enable data transfer between contactless element 316 and other elements of the device, where contactless element 316 may include a secure memory and a near field communications data transfer element.

Data storage 312 may be a memory that stores data, and may be in any suitable form including a magnetic stripe, a memory chip, etc. The memory may be used to store data such as user identification or authentication information, user account information, transaction data, etc. Stored financial information may include information such as bank account information, bank identification number (BIN), credit or debit card account number information, account balance information, expiration date, consumer information such as name, date of birth, etc. Note that such data may instead, or also be stored in a secure data storage element, such as secure data storage 110 of FIG. 2 or a similar secure memory that is part of contactless element 316. As described, data storage 312 may also contain instructions which when executed by processor 304 implement operations or processes that are part of the operation of the device.

Figure 4:
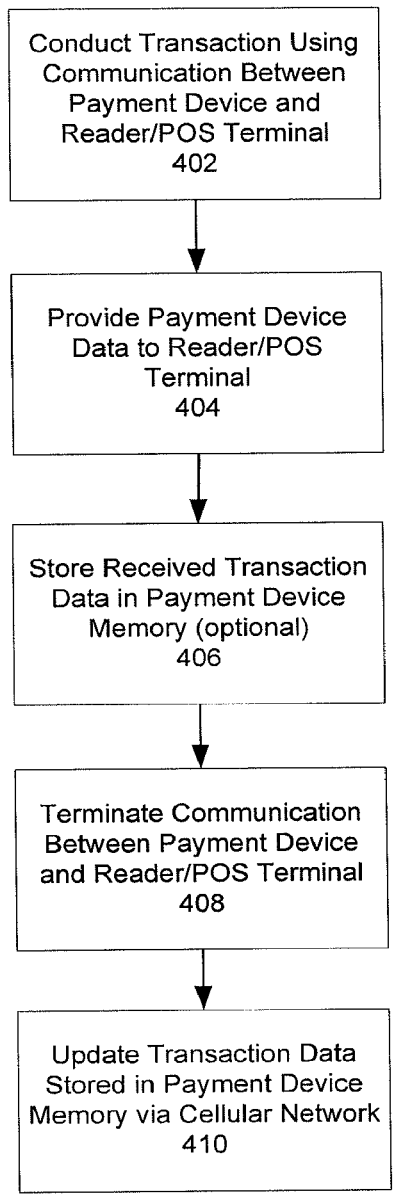
FIG. 4 is a flow chart illustrating an embodiment of the inventive method or process for updating or synchronizing transaction data for a transaction that uses a contactless element contained within a mobile device.

FIG. 4 is a flowchart illustrating an embodiment of the inventive method or process for updating or synchronizing transaction data for a transaction that uses a contactless element contained within a mobile device. The process steps or stages illustrated in the figure may be implemented as an independent routine or process, or as part of a larger routine or process. Note that each process step or stage depicted may be implemented as an apparatus that includes a processor executing a set of instructions, a method, or a system, among other embodiments.

As shown in the figure, a payment device is used to provide payment for a transaction. Depending on the transaction, the payment device may be used to conduct (or otherwise participate in) a transaction as a result of communication between the payment device and a Merchant device reader or point of sale terminal (stage 402, and as depicted, for example, by element 130 of FIG. 2). The payment device may be a mobile wireless phone or similar device that includes a contactless element, for example (as depicted, for example, by element 102 of FIG. 2 or element 302 of FIG. 3). As discussed, the contactless element is capable of communication and data transfer using a near field communications capability. The transaction may be conducted by passing the payment device near the device reader or point of sale terminal to permit the payment device and reader or terminal to establish communications and exchange data.

At stage 404 data stored in the payment device is provided to the device reader or point of sale terminal. The data may include user identification data, account data, or other data required by a Merchant to authenticate a user and permit the user to initiate or participate in a transaction. Following any needed processing of the provided data by the Merchant, Acquirer (element 132 of FIG. 2), Issuer (element 136 of FIG. 2), or other element(s) of the payment processing system, transaction data may be transferred to the payment device and stored in the memory of the payment device (as depicted in stage 406). In some embodiments, the data is transferred to the device using the near field communications capability of the contactless element and may be stored in the secure data space or other data storage element of the device (as depicted, for example, by element 110 or 113 of FIG. 2, or element 312 or 316 of FIG. 3). The transferred data may include, for example, a record of the transaction, an update to an account balance based on the characteristics of the transaction, an update to the balance of a prepaid card, etc. Note that this step is optional and may not occur for every transaction as the payment device may not be in communication with the device reader/POS terminal for a sufficient period of time to permit the data or the entire set of data to be transferred. In such a situation, the near field communications capability is used to engage in a transaction, but may not be available to transfer transaction related data from the Merchant, Acquirer or Issuer to the payment device.

Communication and data transfer between the payment device and the device reader or point of sale terminal is then ended (stage 408), typically because the payment device is out of range and no longer capable of communicating with the device reader or terminal using the near field communications capability. This may occur, for example, because the payment device is only momentarily positioned near enough to the device reader or terminal to permit effective communication and data transfer (e.g., it is only momentarily "swiped" or presented nearby the device reader or terminal). At a later time, after the payment device is no longer in communication with the device reader or point of sale terminal, the cellular network (as depicted by elements 120 and/or 122 of FIG. 2) is used to provide data to the payment device, where that data may then be stored in a secure data space or other memory location within the device (stage 410).

The data provided over the cellular network to the payment device may include, for example, data used to complete the records for a transaction. Such records might be used to update the data stored in the device to reflect the final amount of a transaction, provide identification data for a transaction, provide a receipt or warranty information for a transaction, update the balance of an account as a result of the completion of the transaction, etc. Note that some or all of the data provided over the cellular network may not have been available until completion of the transaction, at which time the payment device (e.g., a mobile phone or other device in which a contactless element is embedded) may not have been in communication with, or capable of communication with, the device reader or point of sale terminal by means of a near field communications mechanism.

The following is an example of a typical use case or scenario in which embodiments of the inventive system, apparatus and methods may be used. It is noted that the use case is only exemplary, as other use cases or scenarios are possible and will be evident to those of skill in the art.

In one use case or scenario, a counter or "accumulator" for a contactless element embedded in a mobile phone can be updated using the cellular network, after a contactless transaction is initiated using the near field communications capability. Such a counter or accumulator may be used to keep track of an account balance or prepaid account funds, for example. In another example, if there is a problem with a transaction, an Issuer can synchronize the data stored in the contactless device with its own transaction information using the cellular network. For example, a consumer might wish to purchase $75 worth of gas using a mobile phone that includes a prepaid card type of functionality as part of the contactless element. In such a transaction, $75 may be deducted from the prepaid card balance and that data may be stored in a memory in the phone. However, in actuality, the gas pump may stop at $50, because the gas pump stopped working, the consumer could only fill their tank up to $50, etc. In this case, the consumer's prepaid card or balance would show a $75 debit even though the transaction was only for the amount of $50. However, using the cellular network as a communications channel, the Issuer is able to update the transaction records stored in the phone so that the data in the phone's memory (e.g., the secure memory region of the contactless element or another suitable data storage region of the phone) reflects the actual transaction information. This capability can be very important in situations where the balance of an account (as reflected by the data stored in the phone) is used to determine whether a later transaction is authorized.

To provide additional security for the transaction data transferred between the mobile device and the Issuer or Payment Processing Network, embodiments of the present invention may include the capability to encrypt and decrypt the transaction data. This is desirable as encrypting the transaction data may prevent unauthorized users or applications from accessing the data, either on the phone or while the data is in transit over a communications network. As will be described, the distribution of encryption keys or access codes for use in encrypting, decrypting, or otherwise accessing transaction data may be controlled by an Issuer, payment processor, or other suitable entity that is part of a payment processing system. This enables the Issuer or payment processor, for example, to determine which mobile gateways are authorized for transferring or processing payment transaction data. It also provides an Issuer or payment processor with a mechanism for segmenting the data transfer or processing tasks performed by a mobile gateway. The segmentation may be based on a characteristic of the transaction (transaction type (such as debit, credit, prepaid, goods, service), amount (above or below a threshold) or originating location), a characteristic of the consumer (credit history, transaction history, account profile), or a characteristic of the data processing system (processing load, processing or security capabilities of a mobile gateway, etc.).

Figure 5A:
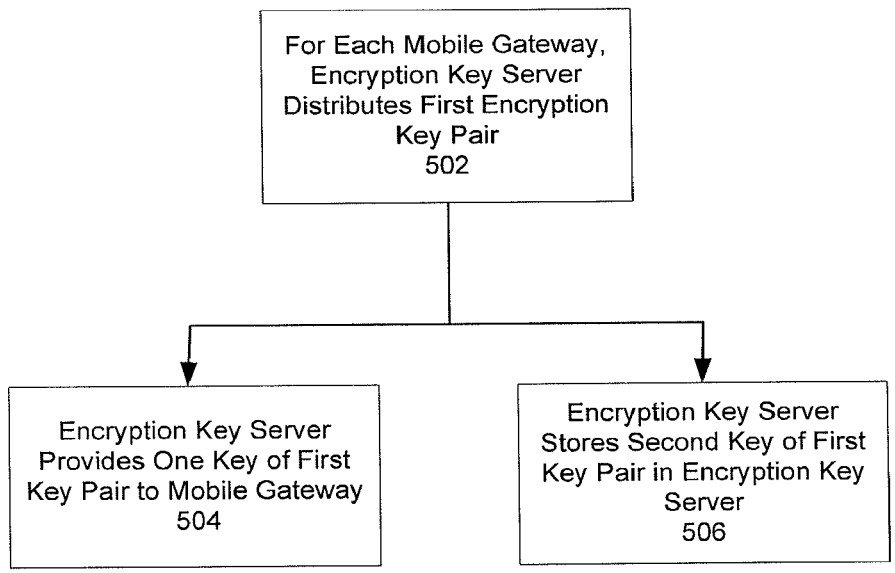
FIGS. 5(*a*), 5(*b*), and 5(*c*) are flow charts illustrating a process for distributing and using encryption keys to provide secure transfer of payment transaction or other data between an Issuer and a mobile device, in accordance with an embodiment of the present invention.
Figure 5B:
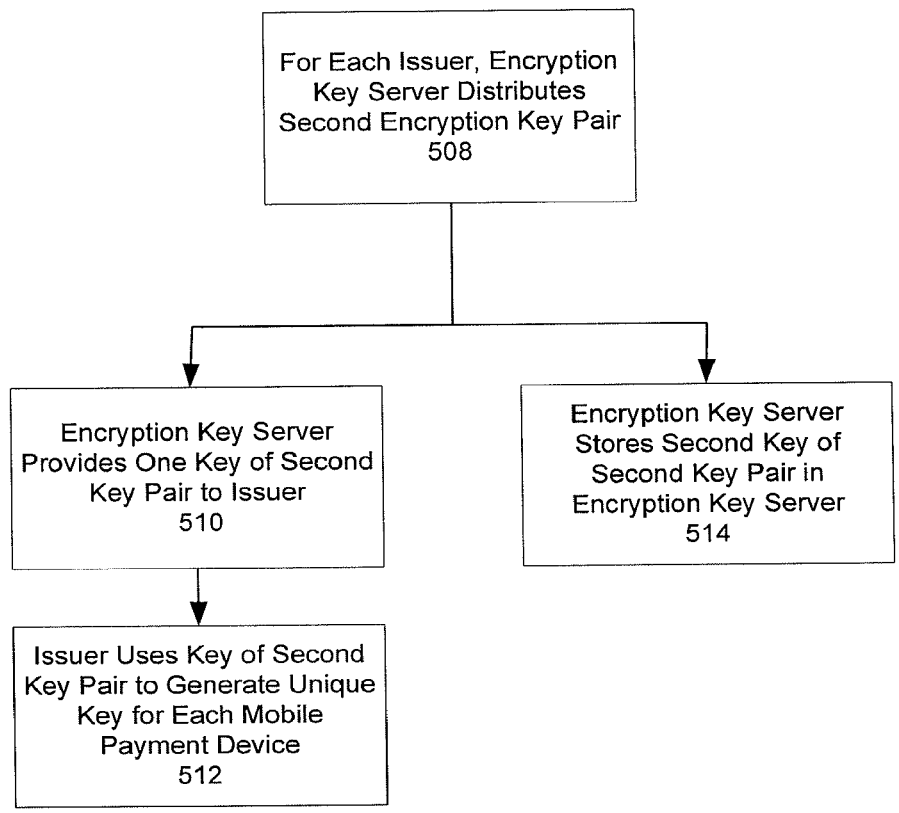
Figure 5C:
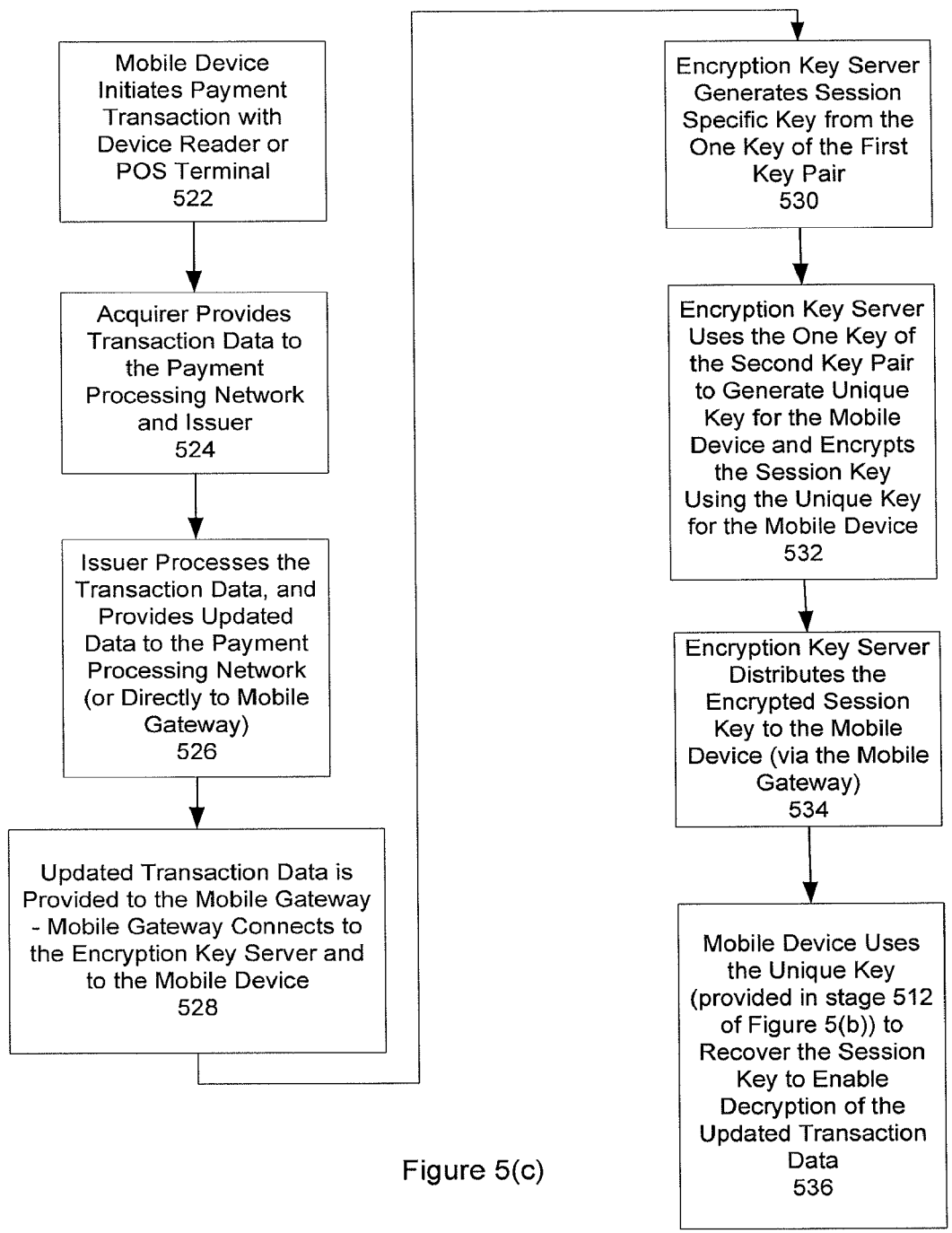

FIGS. 5(a), 5(b), and 5(c) are flow charts illustrating a process for distributing and using encryption keys to provide secure transfer of payment transaction or other data between an Issuer and a mobile device, in accordance with an embodiment of the present invention. The process steps or stages illustrated in the figures may be implemented as an independent routine or process, or as part of a larger routine or process. Note that each process step or stage depicted may be implemented as an apparatus that includes a processor executing a set of instructions, a method, or a system, among other embodiments. The apparatus may be an encryption key distribution server (such as element 140 of FIG. 2, which may be implemented as part of another element of a payment processing system), a payment processor, or another suitable element of a data processing or payment processing system. Further, although the encryption and decryption process described with reference to FIGS. 5(a), 5(b), and 5(c) use encryption keys, other encryption methods or security techniques (such as access codes, etc.) may be used in implementing embodiments of the present invention and are understood to be included within the description of the invention contained herein.

FIG. 5(a) illustrates the stages involved in a process for an encryption key distribution server (e.g., element 140 of FIG. 2) to distribute an encryption key of a first key pair to a mobile gateway. FIG. 5(b) illustrates the stages involved in a process for using the encryption key server to distribute an encryption key of a second key pair to an Issuer. FIG. 5(c) illustrates the stages involved in a process for using the encryption keys distributed to the mobile gateway and to the Issuer to encrypt data generated by the Issuer in the mobile gateway for transmission to the mobile device, and to decrypt that data in the mobile device. As will be described, in some embodiments, the encryption and decryption processes used to enable enhanced data security depend upon the use of a pair of "keys" which are used in accordance with an accepted encryption or data security protocol (e.g., symmetric key standards and protocols), although other suitable methods or processes (such as the public key infrastructure (PKI) standards and protocols) may also be used.

As shown in FIG. 5(a), at stage 502 an encryption key server (e.g., element 140 of FIG. 2) is used to distribute a first encryption key pair (or more precisely, a key of a first encryption key pair) to a mobile gateway that will participate in the encryption/decryption processes. Note that the keys can be generated within the encryption key server or provided to the server by another entity, such as an authorized data processor, Issuer, payment processor, or element of a data processing network. Note that the process described with reference to FIG. 5(a) is performed for each mobile gateway that will be used in the transfer of transaction data between the mobile payment device and the payment processing network.

Further, each encryption key pair distributed in accordance with the process depicted in FIG. 5(a) can be associated with a specific mobile gateway, so that a different encryption key pair may be used for data transferred via each such gateway, eCommerce server, etc., and a mobile device. This arrangement may allow an Issuer or payment processor (for example) to specify which of multiple mobile gateways is authorized to provide communications and data transfer capabilities for a specific mobile device, group of devices, Issuer, or type of transaction, for example. It also permits an Issuer or payment processor (for example) to be the entity responsible for authenticating a mobile gateway and thereby control which of multiple mobile gateways is a valid one for processing a specified type of transaction, for processing transaction data for a specified group of consumers, for processing transaction data requiring a specific security level, etc. Among other benefits, this permits an Issuer or payment processor to verify the security or status of a mobile gateway, thereby providing protection for consumers and merchants. For example, an Issuer or payment processor may desire to segment the processing of transactions based on the type of transaction or a characteristic of a transaction (e.g., debit, credit, prepaid, a range of transaction amounts, a region or time zone in which transactions are originated, etc.), or based on a characteristic of the consumer or mobile device responsible for originating the transaction (e.g., a credit rating of the consumer, the configuration of the mobile device, the type or class of payment application or payment device, etc.). The segmentation of the processing of transactions among multiple mobile gateways may enable the Issuer or payment processor to better track usage patterns of a payment device contained in the mobile device, dynamically or statically configure the data processing load as needed to achieve a desired load balancing among transaction data provided by multiple mobile gateways, or provide a different level of quality control, fraud detection, or value-added service for a group of consumers, payment devices, or type of transactions.

Continuing with the description of FIG. 5(*a*), at stage 504, the encryption key server provides one key of the first key pair to the desired mobile gateway (element 138 of FIG. 2, for example). As mentioned, a different pair of encryption keys may be utilized for each different mobile gateway or server that is, or may be, participating in a transaction process. A record of the encryption key pair used for each such mobile gateway or server would typically be maintained by the encryption key server or an entity responsible for operating the encryption key server. As noted, one key of the first encryption key pair is stored in the mobile gateway (stage 504), while the second key of the first key pair is stored in the encryption key server (stage 506).

FIG. 5(*b*) illustrates the stages involved in a process for using the encryption key server to distribute an encryption key of a second key pair to an Issuer. Note that the keys can be generated within the encryption key server or provided to the server by another entity, such as an authorized data processor, Issuer, payment processor, or element of a data processing network. Note that the process described with reference to FIG. 5(*b*) is performed for each Issuer.

At stage 508, the encryption key server begins the process of distributing a key of a second key pair to an Issuer. One key of the second key pair is provided to the Issuer (stage 510) and the other key of the second key pair is stored in the encryption key server (stage 514). The Issuer uses the received key of the second key pair to generate a unique key (or other form of access control data) for each mobile payment device that is registered with the Issuer (stage 512). As will be described, this unique key will be distributed to the mobile payment device and used to decrypt transaction data provided to the device as part of an update of the transaction data stored in the device, or as part of a transaction or account record stored in the device. Note that the unique key provided to the mobile device may also be used to encrypt data that is generated by the device or the payment application installed in the device for secure transfer to an Issuer or other entity.

FIG. 5(*c*) illustrates the stages involved in a process for using the encryption keys distributed to the mobile gateway and to the Issuer to encrypt data generated by the Issuer in the mobile gateway for transmission to the mobile device, and to decrypt that data in the mobile device. Note that the process or method described with reference to FIG. 5(*c*) may be performed for each transaction. At stage 522, a mobile device initiates a payment transaction by interacting with a device reader or point of sale terminal (e.g., element 130 of FIG. 2). As part of the transaction process, the Acquirer (e.g., element 132 of FIG. 2) provides transaction data to the Payment Processing Network (e.g., element 134 of FIG. 2) and ultimately to the Issuer (e.g., element 136 of FIG. 2) at stage 524, typically as a result of communication between the Payment Processing Network and the Issuer.

The Issuer processes the transaction data and generates updated transaction data which is intended to be provided to the mobile device. The generated data may be for example, in the form of transaction records, updates or corrections to an account balance, etc. Thus, the process described with reference to FIG. 5(*c*) may be used for example, as part of the process described with reference to FIG. 4 (e.g., to exchange or update transaction related data as part of a transaction query, update or reconciliation process performed by the Issuer). The generated data is provided to the Payment Processing Network at stage 526. Note that in some embodiments, and depending upon the communications network or connections being used, the generated data may instead be provided directly to the mobile gateway.

If there is no direct connection between the Issuer and mobile gateway, then the generated data provided to the Payment Processing Network is provided to the mobile gateway. The mobile gateway connects to the encryption key server and to the mobile device (stage 528). At stage 530, the encryption key server generates a session specific key from the stored key of the first key pair. The encryption key server then generates the unique key for the mobile device using the stored key of the second key pair (stage 532). The encryption key server then encrypts the generated session key using the unique key for the mobile device (stage 532). The encryption key server then distributes the encrypted session key to the mobile device via the mobile gateway (stage 534). The mobile device receives the encrypted session key, recovers the session key using its unique key, and then uses the session key to decrypt the transaction data it received from the mobile gateway (stage 536). The decrypted data is then made available to the payment application resident on the mobile device for processing, storage, display to the user, or another relevant function. The decrypted data may be stored in a secure data storage medium or other suitable element.

Note that the process of FIG. 5 has been described with reference to distributing a key of an encryption key pair to a mobile gateway for storage in the gateway—this enables the gateway to encrypt and decrypt data that passes through the gateway. In some embodiments, one key of a pair may be distributed from the encryption key server to the Issuer to enable the Issuer to perform some or all of the data encryption and decryption operations. Similarly, one key of a pair may be distributed from the encryption key server to an element of the payment processing network (element 134 of FIG. 2, as suggested by the dot/dash line in the figure). In such embodiments, the element of the payment processing network (such as a payment processor) may perform some or all of the data encryption and decryption operations. Note also that as mentioned, even if the Issuer does not perform the data encryption/decryption processes, the Issuer may be involved in the encryption key distribution process by communicating with the encryption key distribution server to validate an encryption key, determine which encryption keys are distributed to which mobile gateways, authenticate a mobile gateway, assign a security level to a mobile gateway, etc.

After distribution of the encryption/decryption keys, the keys may be used to provide a secure method of exchanging transaction data between the mobile device and the Issuer. In some embodiments, this may involve establishing a secure channel between a payment application resident in the mobile device and the mobile gateway, with the gateway acting as an intermediary between the mobile device and the payment processing network (and hence the Issuer by virtue of the Issuer's communication with the payment processing network). Typically, the exchange of transaction data may involve two paths: (1) data generated in the mobile device for transfer to the payment processing network; and (2) data generated by the Issuer for transfer to the mobile device.

As mentioned, an encryption key may be used to encrypt data generated in the mobile device for transmission, and to decrypt that data in the mobile gateway for use by an element of the payment processing network or the Issuer. In this use case, payment application data generated by the mobile device is encrypted using a key provided to the mobile device. The encryption process may occur within the secure data storage under the control of the payment application, or by another suitable process. The encrypted data may include security or access data, payment account data (account identifiers, account balances, etc.), transaction data, user identification data, etc. The encrypted data is transmitted from the mobile device over the cellular network to the cellular system and then to the mobile gateway. The mobile gateway uses a key stored in the gateway to decrypt the received data so that the data may be provided to the payment processing network and the Issuer. Note that this process of encrypting data generated in the mobile device for transfer to the payment processing network or Issuer may be used as part of the process described with reference to FIG. 4 (e.g., to transfer transaction related data as part of a transaction query, update or reconciliation process). However, this process may also be used in situations other than those described with reference to FIG. 4, such as to provide a secure data exchange between a mobile device and a payment processing network or Issuer using a wireless/cellular network, for the purpose of initiating or otherwise conducting a payment transaction.

Note that in the context of the Issuer providing transaction data via the wireless network to update or correct data stored in the mobile device after the device is no longer in communication with a device reader or point of sale terminal, the process, functions, or operations of described would typically be utilized to provide data security. The process, functions, or operations described may also be used to transfer data from the mobile device to the payment processing network in the context of initiating a transaction or performing another function over the wireless network. However, as previously described, a transaction may also be initiated using the near field communications capability of the contactless element contained in the mobile device.

Figure 6:
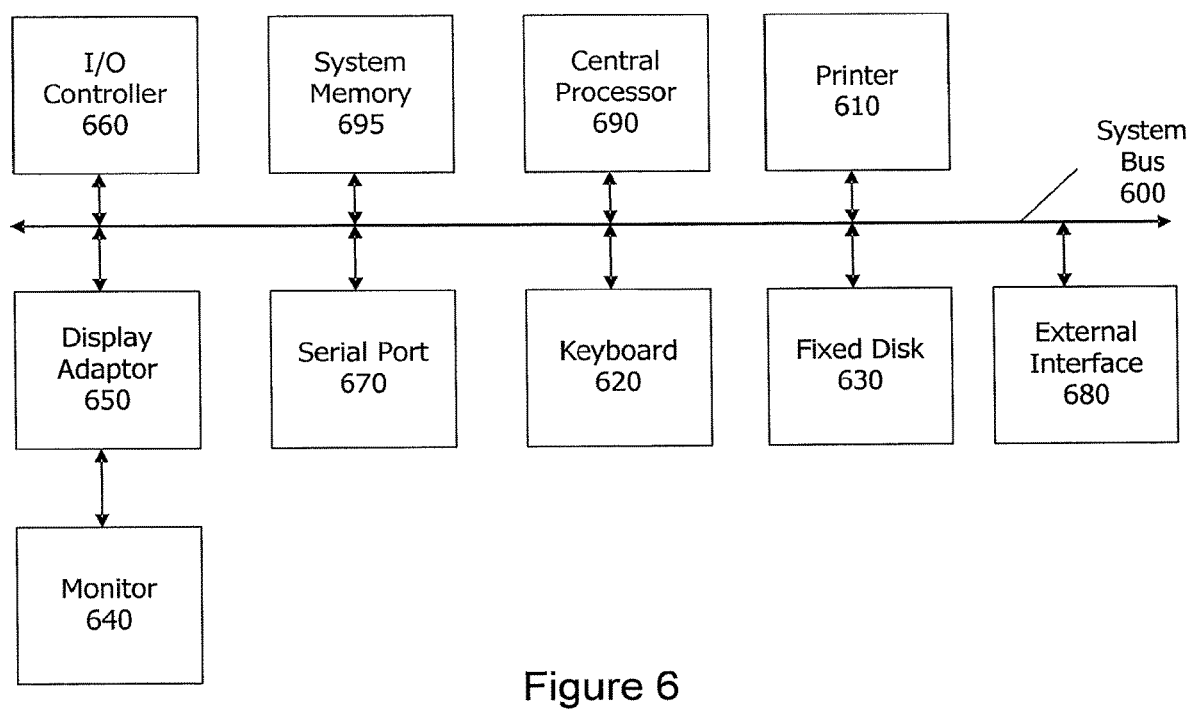
FIG. 6 is a block diagram of an exemplary computing apparatus that may be used to implement an embodiment of the inventive method or process for updating or synchronizing transaction data for a transaction that uses a contactless element contained within a mobile device.

FIG. 6 is a block diagram of an exemplary computing apparatus that may be used to implement an embodiment of the inventive method or process for updating or synchronizing transaction data for a transaction that uses a contactless element contained within a mobile device. The elements of the computing apparatus illustrated in FIG. 6 may be used to implement the inventive processes, methods, or operations in whole or in part, and may be part of a server or other computing apparatus (e.g., a mobile gateway, an Issuer managed server, etc.). The subsystems shown in FIG. 6 are interconnected via a system bus 600. Additional subsystems such as a printer 610, keyboard 620, fixed disk 630 (or other memory comprising computer readable media), monitor 640, which is coupled to display adapter 650, and others are shown. Peripherals and input/output (I/O) devices, which couple to I/O controller 660, can be connected to the computer system by any number of means known in the art, such as serial port 670. For example, serial port 670 or external interface 680 can be used to connect the computer apparatus to a wide area network such as the Internet, a mouse input device, or a scanner. The interconnection via system bus allows the central processor 690 to communicate with each subsystem and to control the execution of instructions from system memory 695 or the fixed disk 630, as well as the exchange of information between subsystems. The system memory 695 and/or the fixed disk 630 may embody a computer readable medium.

In accordance with embodiments of the present invention, there have been described a system, apparatuses, and methods for enabling use of a mobile device that includes a contactless element in a payment transaction. The contactless element is embedded within a mobile device that is capable of communication and data transfer over a cellular network and using a near field communications capability. The contactless element may include a secure data storage region that is used to store transaction data, account data, etc. The cellular network is used to provide an over the air update or reconciliation of transaction data stored in the mobile device in situations in which a transaction was initiated using the contactless element and a near field communications mechanism, but the mobile device is no longer capable of such communication.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A data processing device, comprising:
 a processor;
 a memory; and
 a set of instructions stored in the memory, which when executed by the processor implement a method to:
 receive data for a transaction on an account from a point of sale terminal, the data including an actual transaction amount of the transaction, wherein at least some of the data is provided to the point of sale terminal by a mobile device that communicates with the point of sale terminal, wherein the mobile device stores an accumulator, receives an initial transaction amount of the transaction from the point of sale terminal, and adjusts the accumulator from a first accumulator value to a second accumulator value based on the initial transaction amount;

process the received data to generate a record of the transaction, wherein the record of the transaction includes the actual transaction amount; and synchronize the accumulator stored in the mobile device by providing the record of the transaction including the actual transaction amount to an element of a wireless communications system, thereby causing the record of the transaction to be provided to the mobile device over a wireless network, wherein the mobile device adjusts the accumulator from the second accumulator value to a third accumulator value based on a difference between the actual transaction amount of the transaction and the initial transaction amount of the transaction.

2. The data processing device of claim 1, wherein the mobile device is a mobile phone.

3. The data processing device of claim 1, wherein the accumulator stored in the mobile device indicates funds of the account associated with the mobile device.

4. The data processing device of claim 3, wherein the account is one of a prepaid account, a credit account, or a debit account.

5. The data processing device of claim 3, wherein the data processing device is a computer.

6. The data processing device of claim 1, wherein the record of the transaction is provided after the transaction is complete.

7. The data processing device of claim 6, the synchronizing of the accumulator corrects a discrepancy in the transaction.

8. The data processing device of claim 1, wherein the method implemented by the processor further comprises providing warranty information to the mobile device.

9. The data processing device of claim 1, wherein the method implemented by the processor further comprises providing additional transaction records to the mobile device.

10. The data processing device of claim 1, wherein the record of the transaction is stored in a secure memory storage region at the mobile device.

11. The data processing device of claim 10, wherein the secure memory storage region is within a near field communications mechanism.

12. The data processing device of claim 1, wherein the record of the transaction is provided to the mobile device as encrypted data, wherein the encrypted data is decrypted by the mobile device.

13. The data processing device of claim 1, wherein the element in the wireless communications system is one of a plurality of mobile gateways.

14. The data processing device of claim 13, wherein each mobile gateway in the plurality of mobile gateways is associated with a particular geographical area.

15. The data processing device of claim 13, wherein each mobile gateway in the plurality of mobile gateways is associated with a particular type of mobile device.

16. The data processing device of claim 13, wherein each mobile gateway in the plurality of mobile gateways is associated with one or more of characteristics of the transaction.

17. A method for processing data, comprising:

receiving, at a data processing device, data for a transaction on an account from a point of sale terminal, the data including an actual transaction amount of the transaction, wherein at least some of the data is provided to the point of sale terminal by a mobile device that communicates with the point of sale terminal, wherein the mobile device stores an accumulator, receives an initial transaction amount of the transaction from the point of sale terminal, and adjusts the accumulator from a first accumulator value to a second accumulator value based on the initial transaction amount;

processing, by the data processing device, the received data to generate a record of the transaction, wherein the record of the transaction includes the actual transaction amount; and synchronizing, by the data processing device, the accumulator stored in the mobile device by providing the record of the transaction including the actual transaction amount to an element of a wireless communications system, thereby causing the record of the transaction to be provided to the mobile device over a wireless network, wherein the mobile device adjusts the accumulator from the second accumulator value to a third accumulator value based on a difference between the actual transaction amount of the transaction and the initial transaction amount of the transaction.

18. The method of claim 17, further comprising determining that the initial transaction amount received by the mobile device from the point of sale terminal is different from the actual transaction amount, wherein the synchronizing of the accumulator is performed in response to the determining that the initial transaction amount received by the mobile device from the point of sale terminal is different from the actual transaction amount.

19. The method of claim 17, wherein the record of the transaction is stored in a secure memory storage region within a near field communications mechanism of the mobile device, and wherein the record of the transaction is provided to the mobile device as encrypted data, wherein the encrypted data is decrypted by the mobile device.

20. The method of claim 17, wherein the element in the wireless communications system is one of a plurality of mobile gateways, the method further comprising determining the wireless communications system from the plurality of mobile gateways based on one or more characteristics of a data processing system associated with the data processing device, wherein the characteristics of the data processing system include a processing load for one or more of the plurality of mobile gateways and security capabilities for one or more of the plurality of mobile gateways.

* * * * *